(12) United States Patent
Shiomi et al.

(10) Patent No.: US 6,614,748 B2
(45) Date of Patent: *Sep. 2, 2003

(54) MOUNTING ASSEMBLY FOR MOUNTING A DISK DRIVE UPON A TURNTABLE OF A DISK DRIVE ASSEMBLY

(75) Inventors: Tetsuhiro Shiomi, Kanagawa (JP); Tomoaki Morishita, Shizuoka (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/538,428

(22) Filed: Mar. 29, 2000

(65) Prior Publication Data
US 2003/0026193 A1 Feb. 6, 2003

(30) Foreign Application Priority Data
Mar. 31, 1999 (JP) .......................................... 11-093032

(51) Int. Cl.[7] ............................................... G11B 25/00
(52) U.S. Cl. ....................................... 369/270; 369/271
(58) Field of Search ................................. 369/270, 271

(56) References Cited

U.S. PATENT DOCUMENTS 5,799,006 A * 8/1998 Mukawa ..................... 369/270
6,205,111 B1 * 3/2001 Hayakawa .................. 369/270

* cited by examiner

*Primary Examiner*—David Davis
(74) *Attorney, Agent, or Firm*—Frommer Lawrence & Haug LLP; William S. Frommer; Matthew K. Ryan

(57) ABSTRACT

There is a problem that a high fitting accuracy between the table body and a chucking ring of a turntable is requested because the table body and the chucking ring are separately constituted and the chucking ring is integrated with the table body by fitting the ring to the body. The present invention relates to a disk drive comprising a turntable (47) on which an optical disk (33) used to reproduce an information signal is mounted and a spindle motor (51) to whose rotating portion the turntable (47) is set. The turntable (47) is provided with a mounting portion (47a) on which the optical disk (33) is mounted and a fitting portion (47b) to be fitted to the center hole (33a) of the optical disk (33) and having an elastic piece (14b) to be pressure-welded to the inner periphery of the center hole (33a), in which the mounting portion (47a) and the fitting portion (47b) are formed into one body.

6 Claims, 21 Drawing Sheets

FIG. 22A
(PRIOR ART)
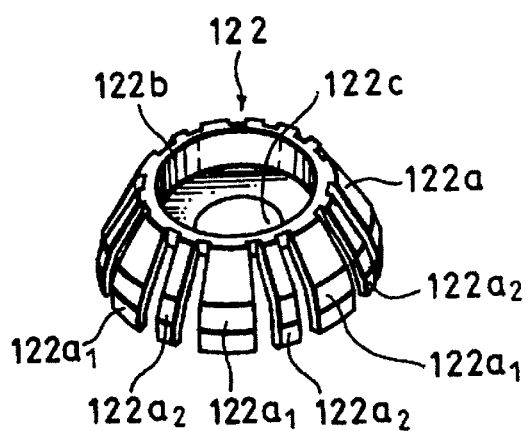
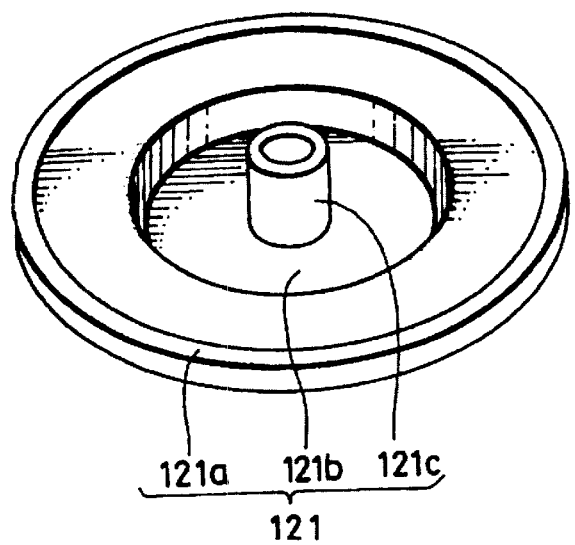
FIG. 22B
(PRIOR ART)
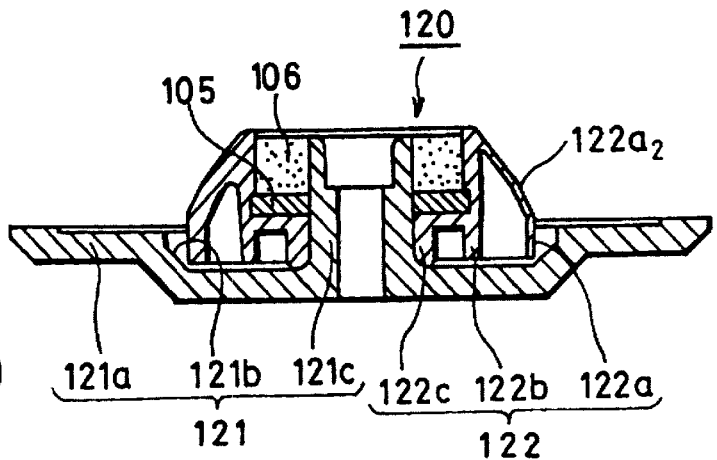

MOUNTING ASSEMBLY FOR MOUNTING A DISK DRIVE UPON A TURNTABLE OF A DISK DRIVE ASSEMBLY

BACKGROUND OF THE INVENTION

1. Field of the Invention

The present invention relates to a disk drive for rotating a discoid recording medium such as an optical disk or optical magnetic disk and recording (writing) and/or reproducing (reading) an information signal by moving a pickup along the information recording plane of the discoid recording medium and to a turntable to be preferably used for the disk drive.

2. Description of the Prior Art

A disk drive has been generally produced so far which records and/or reproduces an information signal by using a discoid recording medium such as an optical disk {CD (Compact Disk) or CD-ROM (Read Only Memory)} or an optical magnetic disk (OD). The disk drive rotates an optical disk by horizontally setting the optical disk serving as a discoid recording medium onto a turntable set to the rotating shaft of a spindle motor and applies a laser beam to the information recording plane of the optical disk by an optical head of an optical pickup serving as a pickup. The optical head is moved from the center of the optical disk outward in radial direction so as to write an information signal in the information recording plane or read an information signal previously recorded in the information recording plane.

In the case of this type of the disk drive, it is necessary that the information-recording plane of an optical disk in which an information signal is recorded and an optical head of an optical pickup are set to a predetermined tilt angle or less. This is because the accuracy of reproduction of an information signal greatly depends on the tilt angle of the optical head. In this case, to execute high-density, high-accuracy recording and/or reproducing of an optical disk, it is preferable to set the optical axis of the objective of an optical head vertically (90°) to the information recording plane of the optical disk. However, because the tilt of an optical disk, verticality of a spindle motor, and verticality of an objective fluctuate, it is difficult to set the optical axis of the objective accurately vertically to the information recording plane of the optical disk.

Therefore, in the case of a disk drive using an optical disk such as a CD or CD-ROM and an information recording medium, the allowable range of a relative tilt between an optical disk and an objective is standardized to 1.20 or less (a tilt angle of an optical disk is standardized to 0.60 or less and a tilt angle of a spindle motor or objective is standardized to 0.60 or less). Moreover, the optical axis of an objective is adjusted in a range between predetermined tilts by tilting an optical pickup on the basis of a state in which an optical disk is set to a predetermined position.

A disk drive shown in FIG. 20 is known as the disk drive having the above disk tilt mechanism. The disk drive 1 is provided with a spindle chassis 2 constituted of a flat frame on whose inside an almost-quadrangular opening is formed and a pickup chassis 3 constituted of a flat frame on which an opening slightly smaller than the opening of the spindle chassis 2 is formed. A pair of shaft portions 3a protruding to the both sides of the pickup chassis 3 in the width direction is provided for the pickup chassis 3 and moreover, a pair of bearing portions 2a for rotatably supporting the shaft portions 3a is provided for the spindle chassis 2. By combining these pairs of bearing portions 2a and shaft portions 3a, the pickup chassis 3 is supported so as to be swingable in the longitudinal direction of the spindle chassis 2.

A tilt driving mechanism 4 is provided for one side of the spindle chassis 2 in its longitudinal direction and the pickup chassis 3 is oscillated in the longitudinal direction of the spindle chassis 2 in accordance with the operation of the tilt driving mechanism 4. A spindle motor 5 is fixed to the other side of the spindle chassis 2 in its longitudinal direction while turning the rotating shaft of the motor 5 upward. A turntable 6 to which an optical disk is set is integrally set to the rotating shaft of the spindle motor 5.

The turntable 6 has the configuration shown in FIGS. 21A and 21B. That is, the turntable 6 is provided with a table 101, a center cap 102, a movable ring 103, a compression coil spring 104, a yoke plate 105, and a magnet 106. The table 101 has an annular mounting portion 101a on which an optical disk 110 is mounted, a recessed portion 101b constituted of an annular recess provided inside of the mounting portion 101a, and a cylindrical boss portion 101c provided for the central portion of the recessed portion 101b. The center cap 102 is fitted to and integrally set to the boss portion 101c of the table 101.

The center cap 102 is constituted of an annular member whose outside diameter is properly smaller than the diameter of the recessed portion 101b, its thickness is set to a value properly larger than the depth of the recessed portion 101b, and its front end is protruded from the recessed portion 101b. An annular concave portion 102a is formed at the front end of the center cap 102 and the yoke plate 105 and magnet 106 are stored in the concave portion 102a. The movable ring 103 is rotatably fitted to the outer periphery of the center cap 102 so as to be movable in the axial direction.

The movable ring 103 has a sleeved ring 103a, an annular end face 103b provided for one side of the ring 103a, and a tapered slope 103c continuously provided for the outside of the end face 103b in its radius direction. One end of the compression coil spring 104 is set on the inner face of the end face 103b of the movable ring 103. The other end of the compression coil spring 104 is set to the bottom face of the recessed portion 101b and the movable ring 103 is always pressed against the front end of the center cap 102 by the spring force of the compression coil spring 104. The movable ring 103 is prevented from being removed by preventing movement of the movable ring 103 by an outward flange portion 102b provided for the front end of the center cap 102. A fitting portion to be fitted to a center hole 110a of the optical disk 110 is constituted of the slope portion 103c of the movable ring 103 and the flange portion 102b of the center cap 102.

The turntable 6 having the above configuration is set to the state shown in FIG. 21A before the optical disk 110 is mounted and the movable ring 103 energized by the spring force of the compression coil spring 104 contacts with the flange portion 102b of the center cap 102. By setting the optical disk 110 to the turntable 6 from the above state and fitting to the center hole 110a, the above stage is changed to the state shown in FIG. 21B and the movable ring 103 is lowered. As a result, the margin of the center hole 110a of the optical disk 110 contacts with the slope portion 103c of the movable ring 103 and the optical disk 110 is centered by the slope portion 103c.

Moreover, as shown in FIG. 20, a guide shaft 3b and a guide portion (not appearing in FIG. 20) are set to the pickup chassis 3 so as to extend in the longitudinal direction by keeping a predetermined interval from each other in parallel. A slide member 8 of an optical pickup 7 is slidably supported by the guide shaft 3b and the guide portion. Moreover, a not-illustrated rack is fixed to the slide member 8 and a gear located at the end of a head feed mechanism 9 is engaged with the rack. By driving the head feed mechanism 9 and transmitting the torque to the slide member 8, the optical pickup 7 is moved so as to approach to or go away from the turntable 6.

Moreover, a skew sensor 10 for detecting the distance from the information recording plane of an optical disk mounted on the turntable 6 is mounted on the slide member 8. The skew sensor 10 emits light toward the information-recording plane and detects a warpage of the optical disk by receiving the light reflected from the information-recording plane. By changing tilts of the pickup chassis 3 in accordance with a detection result of the skew sensor 10, it is possible to adjust a tilt of the optical axis of the optical head 7a of the optical pickup 7 against a tilt of the information recording plane of the optical disk.

However, in the case of the above conventional disk drive 1, six parts are required because the turntable 6 is constituted by combining the table 101, center cap 102, movable ring 103, compression coil spring 104, yoke plate 105, and magnet 106 and moreover, a lot of man-hours is required. Therefore, there are problems that not only the drive 1 is wasteful but also assembling of the drive 1 is troublesome.

Moreover, because the optical disk 110 is centered to the turntable 6 by lowering the movable ring 103 by the optical disk 110, a high fitting accuracy of the movable ring 103 to the center cap 102 is required. When the accuracy is rough, a problem occurs that smooth movement of the movable ring 103 cannot be secured. Particularly, because the movable ring 103 has a shaft-directional length smaller than the diameter, it is necessary to uniformly press the outer margin of the ring 103 in order to move the ring 103 in the shaft direction. Thus, when the pressure locally works, the movable ring 103 twists and may be caught in the center cap 102.

To solve the above conventional problems, the present applicant previously provided a turntable 120 having the configuration shown in FIGS. 22A and 22B. The turntable 120 is provided with a table 121, a chucking ring 122, a yoke plate 105, and a magnet 106. The table 121 has a mounting portion 121a, a recessed portion 121b, and a boss portion 121c the same as the table 101 does. The chucking ring 122 is fitted to the boss portion 121c of the table 121 and they are integrally set.

The chucking ring 122 is constituted of a tapered cap-shaped member whose outside diameter is properly smaller than the diameter of the recessed portion 121b and its thickness is set to a value properly larger than the depth of the recessed portion 121b, and its front end extrudes from the recessed portion 121b. The chucking ring 122 has an outer-periphery portion 122a, a cylindrical portion 122b, and a boss portion 122c. The boss portion 122c can be fitted to the boss portion 121c of the table 121 and they are integrally constituted by press-fitting the boss portion 122c to the boss portion 121c.

The cylindrical portion 122b of the chucking ring 122 is integrally formed outside of the boss portion 122c and the yoke plate 105 and magnet 106 are stored in the cylindrical portion 122b. The outer periphery 122a of the chucking ring 122 is constituted of a plurality of fixed pieces $122a_1$ radially arranged and a plurality of elastic pieces $122a_2$ respectively arranged between adjacent fixed pieces $122a_1$. These fixed pieces $122a_1$ are and elastic pieces $122a_2$ are respectively connected each other at the front end of the cylindrical portion 122b. Moreover, a proper elasticity is provided for the elastic pieces $122a_2$ by decreasing the pieces $122a_2$ in wall thickness and width compared to the fixed pieces $122a_1$.

In the case of the turntable 120 having the above configuration, the optical disk 110 is centered by the elastic pieces $122a_2$ having a proper elasticity. Moreover, the fixed pieces $122a_1$ provided between adjacent elastic pieces $122a_2$ respectively serve as a guide for inserting the optical disk 110. However, according to the turntable 120 thus improve, the number of parts to be used can be decreased to 4 and thereby, it is possible to improve the assembling-characteristic and productivity. However, an insufficient point is present that a high fitting accuracy between the table 121 and the chucking ring 122 is required.

SUMMARY OF THE INVENTION

The present invention is made to solve the above conventional problems and its object is to provide a disk drive capable of solving the above problems by integrally forming a mounting portion on which a discoid recording medium is mounted and a fitting portion to be fitted to a center hole of the discoid recording medium and having an elastic piece to be pressure-welded to the center hole and a turntable to be preferably used for the disk drive.

To solve the above problems and achieve the above object, the disk drive of the first aspect of the present invention uses a disk drive comprising a turntable on which a discoid recording medium used to record and/or reproduce an information signal is mounted and a spindle motor to whose rotating portion the turntable is set, wherein the turntable is provided with a mounting portion on which the discoid recording medium is mounted and a fitting portion fitted to a center hole of the discoid recording medium and having an elastic piece to be pressure-welded to the inner periphery of the center hole and the mounting portion and fitting portion are integrally formed.

The case of the disk drive of the second aspect of the present invention comprises a fitting portion of a turntable set at the central portion of a mounting portion, a plurality of fixed pieces radially arranged, and a plurality of elastic pieces respectively arranged between adjacent fixed pieces.

The disk drive of the third aspect of the present invention comprises a conical fitting portion, wherein a fixed piece and an elastic piece are connected each other at the tapered front end of the conical fitting portion and the other end of the elastic piece is extended outward in radial direction at a mounting portion and formed into a free end.

The turntable of the fourth aspect of the present invention comprises a mounting portion on which a discoid recording medium used to record and/or reproduce an information signal is mounted and a fitting portion fitted to a center hole of the discoid recording medium and having an elastic piece pressure-welded on the inner periphery of the center hole, wherein the mounting portion and the fitting portion are formed into one body.

The turntable of the fifth aspect of the present invention comprises a fitting portion set to almost central portion of a mounting portion, a plurality of fixed pieces radially arranged, and a plurality of elastic pieces respectively arranged between adjacent fixed pieces.

The turntable of the sixth aspect of the present invention comprises a conical fitting portion, wherein a fixed piece and an elastic portion are connected each other at the tapered front end of the conical fitting portion and the other end of the elastic piece is extended outward in radial direction at a mounting portion and formed into a free end.

As described above, in the case of the disk drive of claim 1 of the present invention, the mounting portion and fitting portion of the turntable are formed into one body. Therefore, it is possible to decrease the number of parts to be used and man-hours for assembling the disk drive and securely center the discoid recording medium. Thus, it is possible to provide a disk drive superior in performance stability.

In the case of the disk drive of the second aspect of the present invention, the fitting portion of the turntable is constituted of a plurality of fixed pieces and a plurality of elastic pieces. Therefore, it is possible to provide a disk drive provided with a turntable having a simple structure and capable of securely centering a discoid recording medium.

In the case of the disk drive of the third aspect of the present invention, the other end of an elastic piece connected with a fixed piece at the tapered end is extended outward in radial direction and formed into a free end. Therefore, it is possible to accurately and securely center a discoid recording medium by pressure-welding the free end of the elastic piece to the center hole of the discoid recording medium.

In the case of the turntable of the fourth aspect of the present invention, the mounting portion and the fitting portion are formed into one body. Therefore, it is possible to decrease the number of parts to be used and man-hours for assembling the turntable and securely center the discoid recording medium. Thus, it is possible to provide a turntable superior in performance stability.

In the case of the turntable of the fifth aspect of the present invention, the fitting portion is constituted of a plurality of fixed pieces and a plurality of elastic pieces. Therefore, it is possible to securely center the discoid recording medium though the turntable has a simple structure.

In the case of the turntable of the sixth aspect of the present invention, the other end of an elastic piece connected with a fixed piece at the tapered front end is extended outward in radial direction and formed into a free end. Therefore, it is possible to accurately securely center the discoid recording medium by pressure-welding the free end of the elastic piece to the center hole of the recording medium.

BRIEF DESCRIPTION OF THE DRAWINGS

FIGS. 8A and 8B show a turntable of a disk drive of the present invention, in which FIG. 8A is a perspective view of the turntable and FIG. 8B is a top view of the turntable;

FIGS. 9A to 9C show a turntable of a disk drive of the present invention, in which FIG. 9A is a bottom view of the turntable, FIG. 9B is a sectional view of the turntable in FIG. 8B, taken along the line B—B in FIG. 8B, and FIG. 9C is a sectional view of the turntable in FIG. 8B, taken along the line C—C in FIG. 8B;

FIGS. 21A and 21B show a conventional turntable, in which FIG. 21A is a sectional view of the turntable before mounting an optical disk and FIG. 21B is a sectional view of the turntable after mounting an optical disk; and FIGS. 22A and 22B show a turntable of the prior art, in which FIG. 22A is a disassembled perspective view of the turntable and FIG. 22B is a sectional view of the turntable.

DETAILED DESCRIPTION OF THE PREFERRED EMBODIMENTS

An embodiment of a disk drive and an embodiment of a turntable of the disk drive to which the present invention is applied are described below by referring to the accompanying drawings. FIGS. 1 to 19 are illustrations showing an embodiment of a disk drive of the present invention. The disk drive of this embodiment is applied to a disk-tray-type disk drive which uses an optical disk such as a CD or CD-ROM having diameters of 12 and 8 cm as a discoid recording medium, carries the optical disk by a disk tray to automatically perform loading, and exclusively reproduces (reads) an information signal recorded in the information recording plane of the optical disk.

Figure 1:
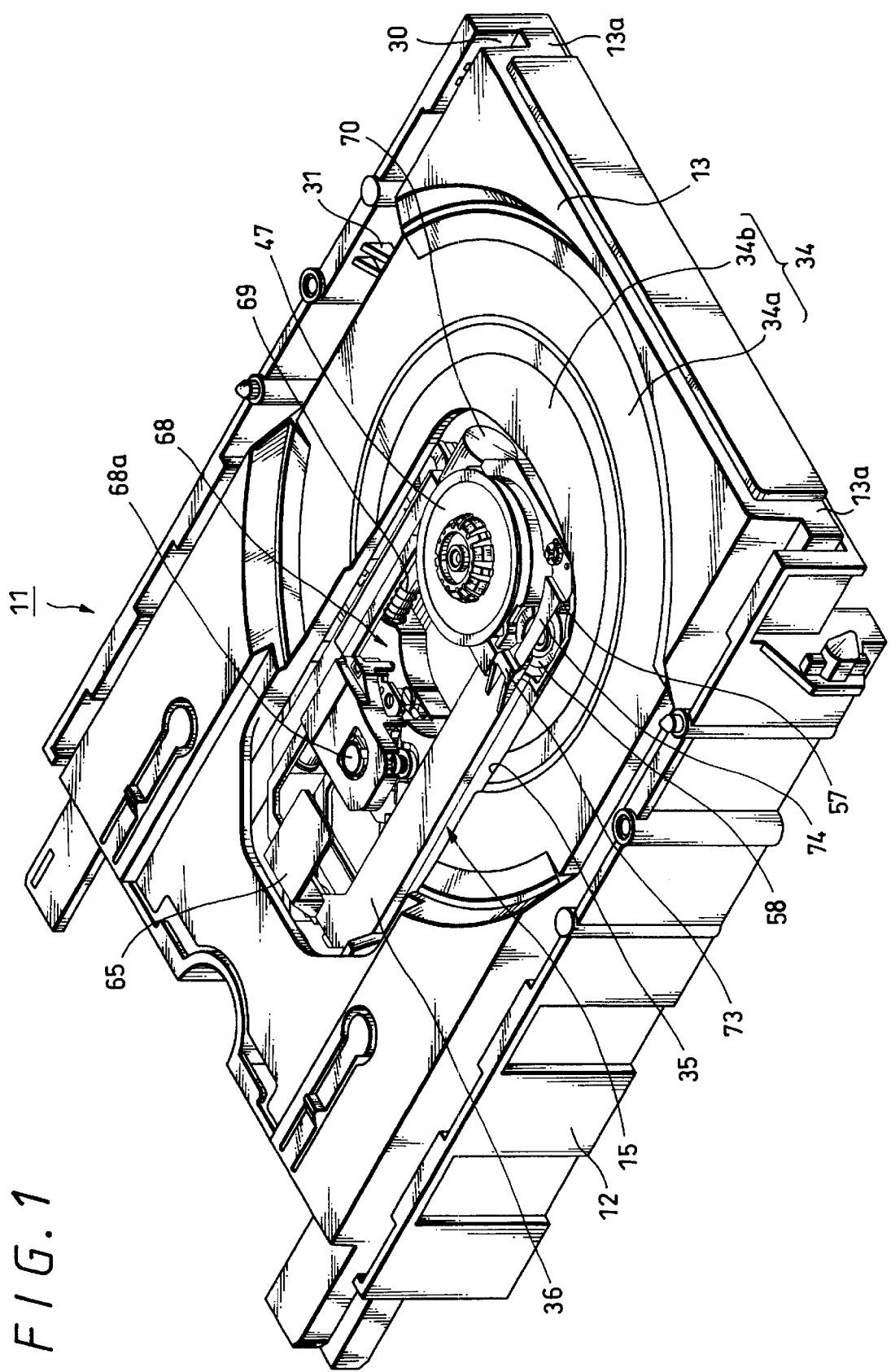
FIG. 1 is an appearance perspective view showing an embodiment of a disk drive of the present invention.
Figure 2:
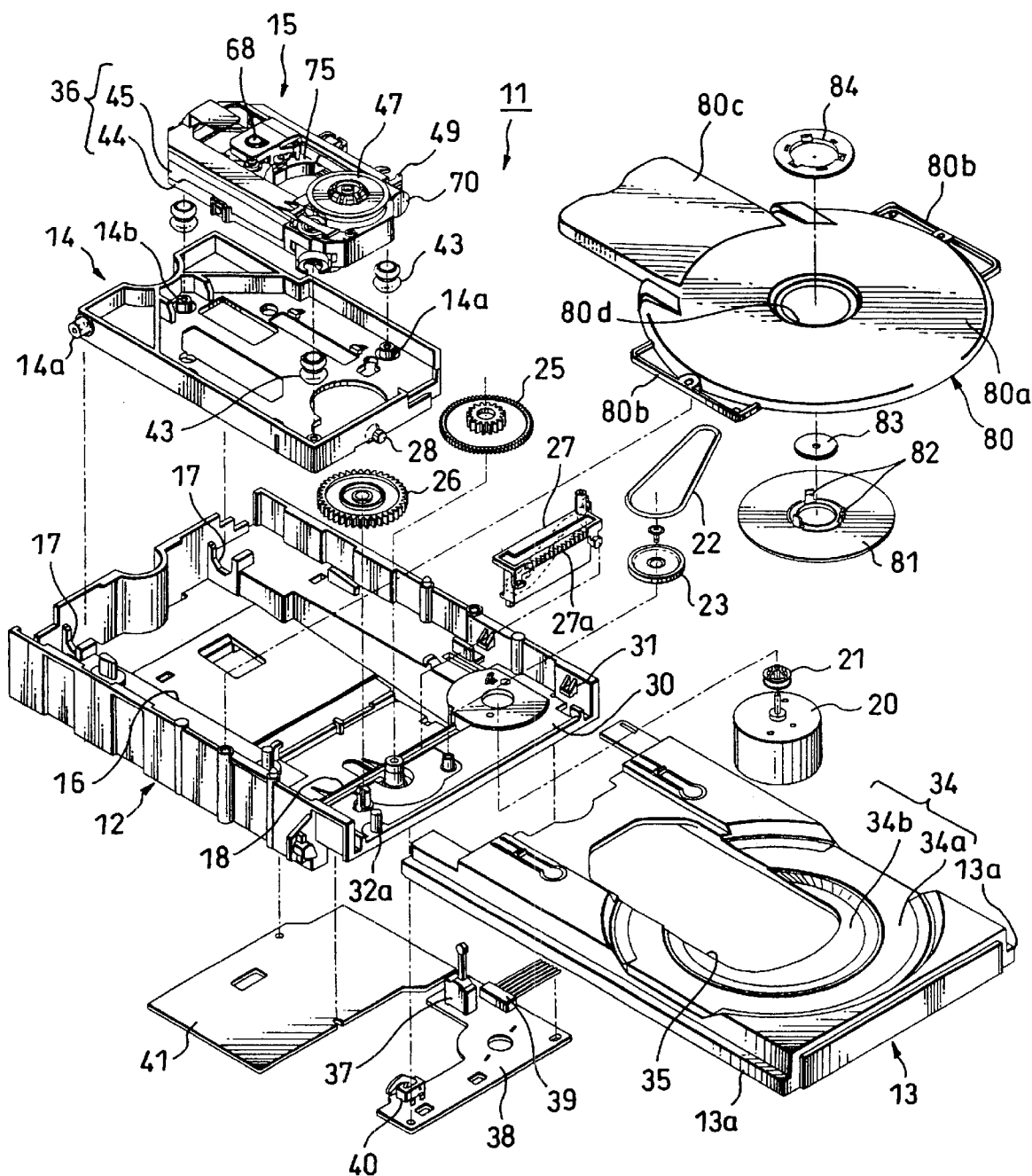
FIG. 2 is a disassembled perspective view of the disk drive of the present invention shown in FIG. 1.
Figure 3:
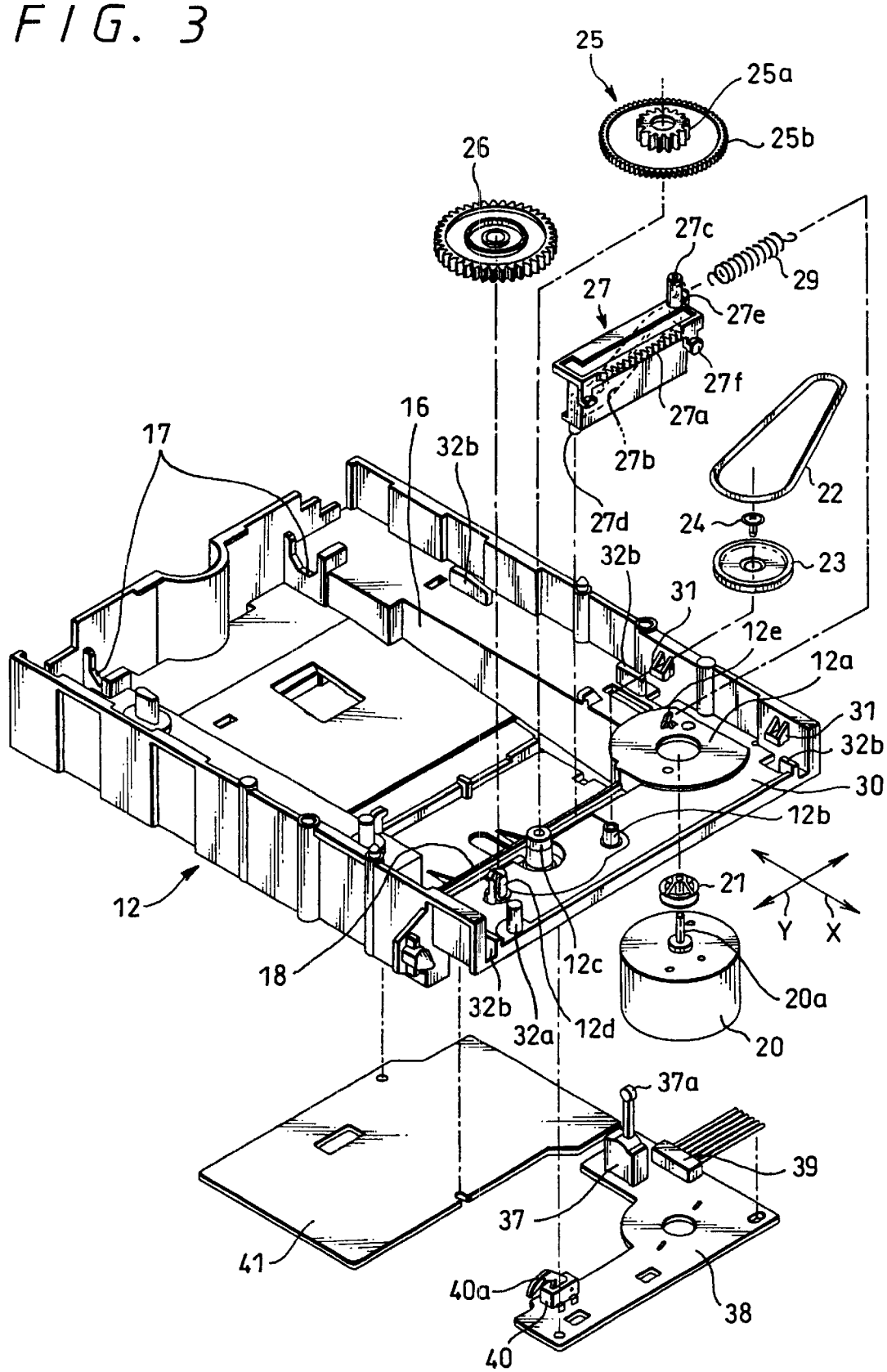
FIG. 3 is an enlarged perspective view of an essential portion in FIG. 2, showing a main chassis and the like of a disk drive of the present invention.
Figure 4:
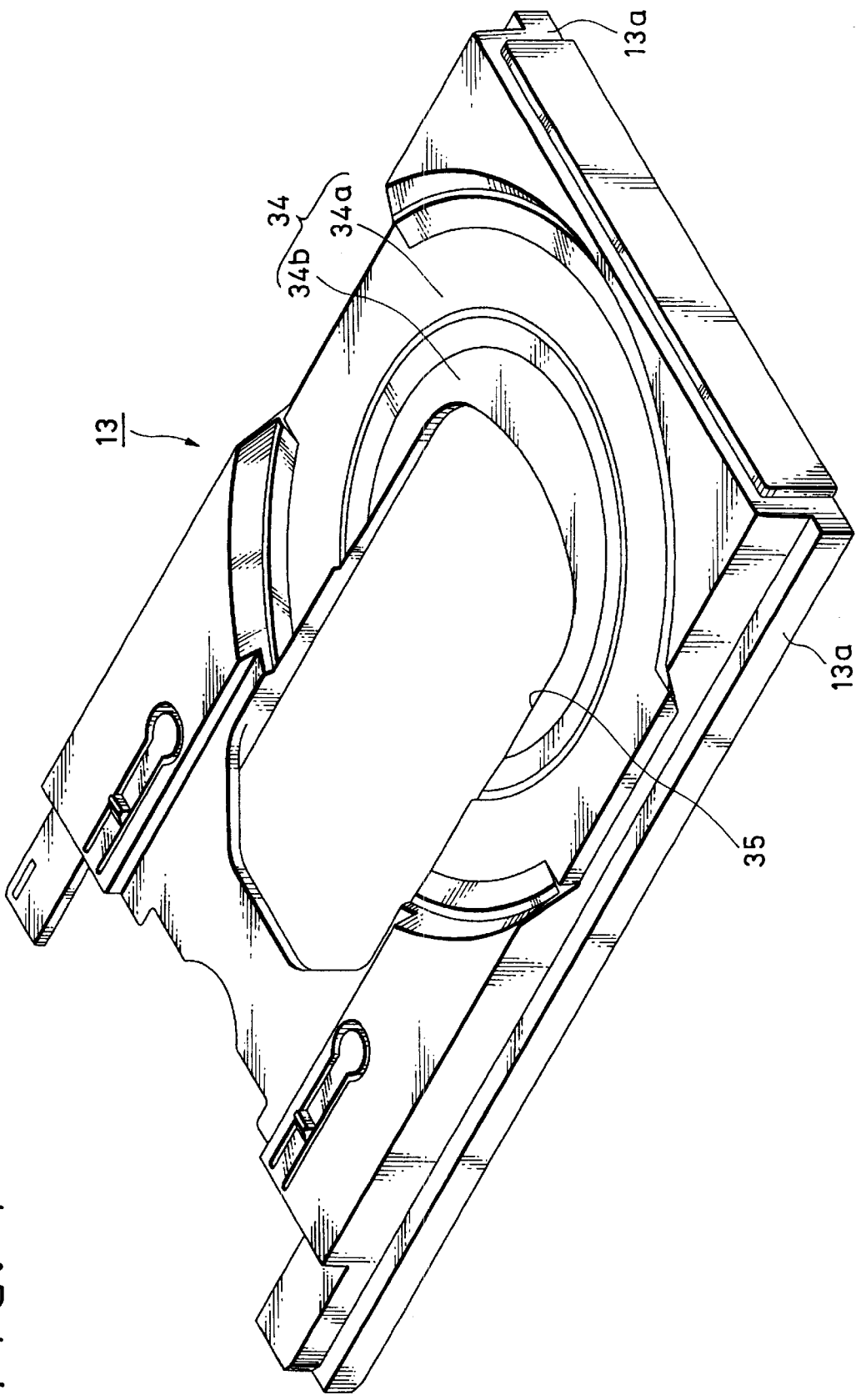
FIG. 4 is a perspective view showing a disk tray of a disk drive of the present invention.
Figure 5:
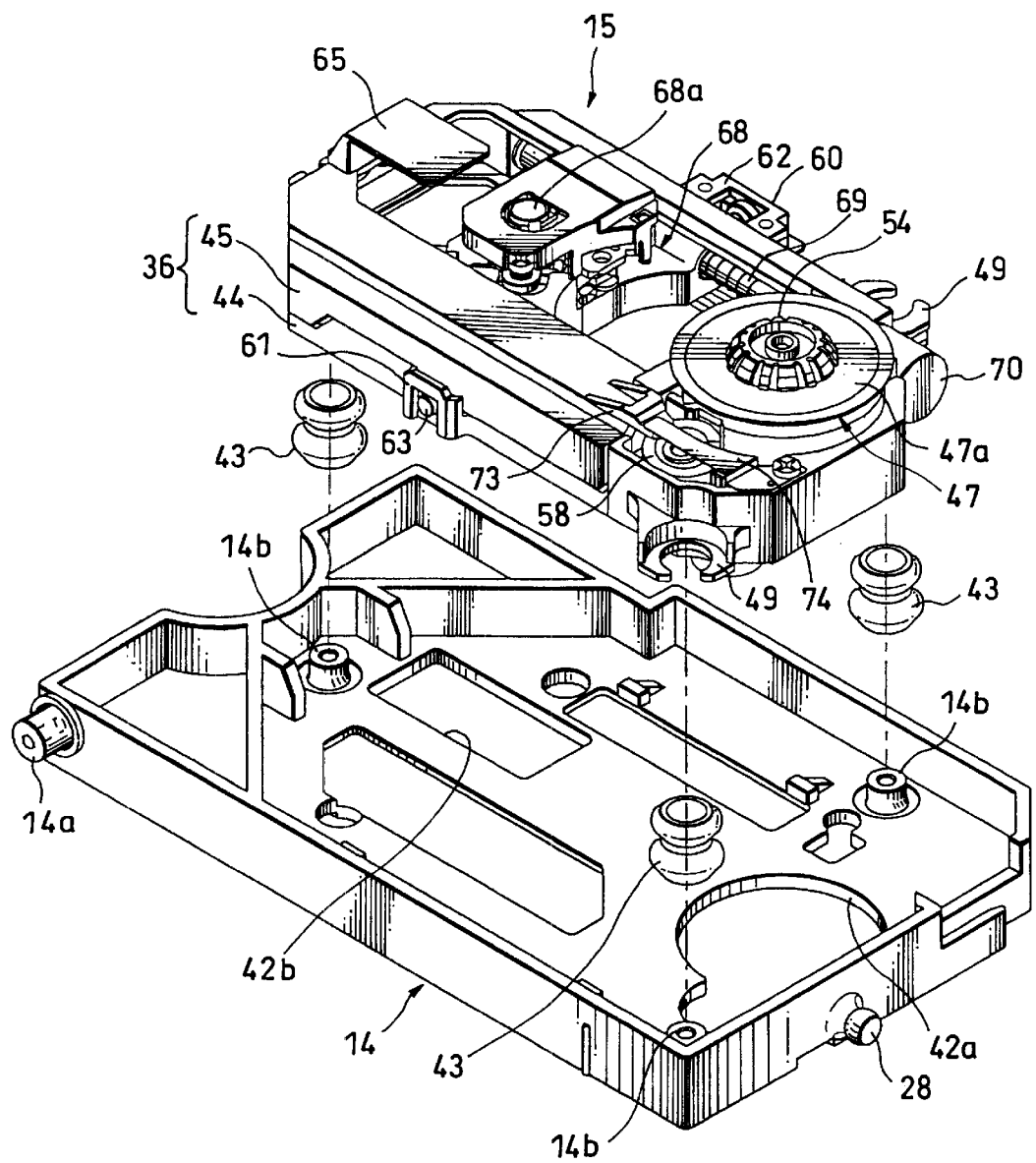
FIG. 5 is an enlarged perspective view of an essential portion in FIG. 2, showing a base chassis and a base holder of a disk drive of the present invention.
Figure 6:
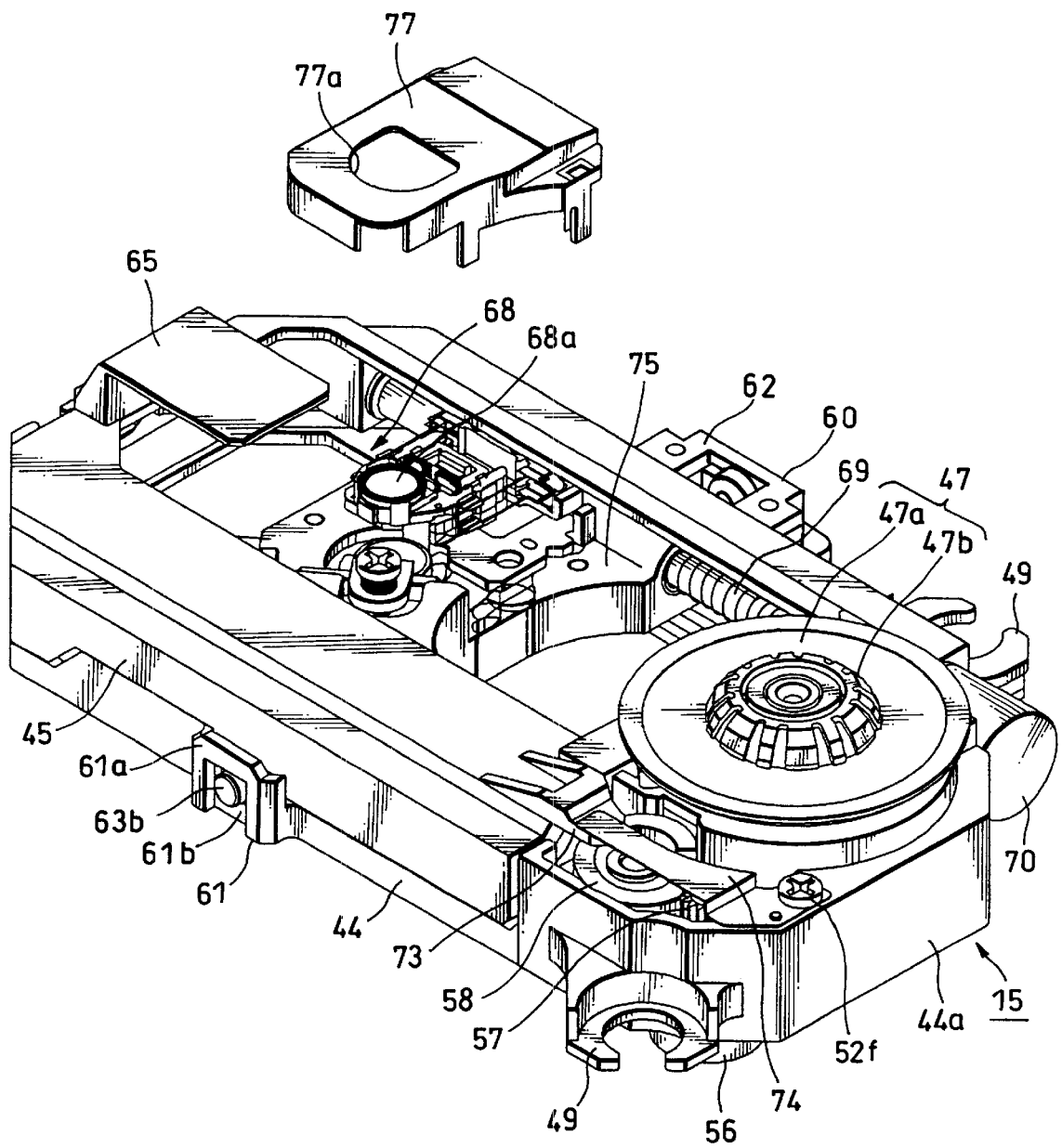
FIG. 6 shows a base unit of a disk drive of the present invention, which is a perspective view of a disassembled biaxial cover.

That is, FIG. 1 is a perspective view showing an embodiment of a disk drive of the present invention, FIG. 2 is a disassembled perspective view of the disk drive in FIG. 1, FIG. 3 is an enlarged perspective view of a main chassis shown in FIG. 2, FIG. 4 is a perspective view showing a disk tray of the disk drive in FIG. 1, FIG. 5 is a perspective view showing a base unit and a base holder of the disk drive in FIG. 1, FIG. 6 is a perspective view of the base unit shown in FIG. 5 from which a biaxial cover is disassembled, FIG.

Figure 8A:
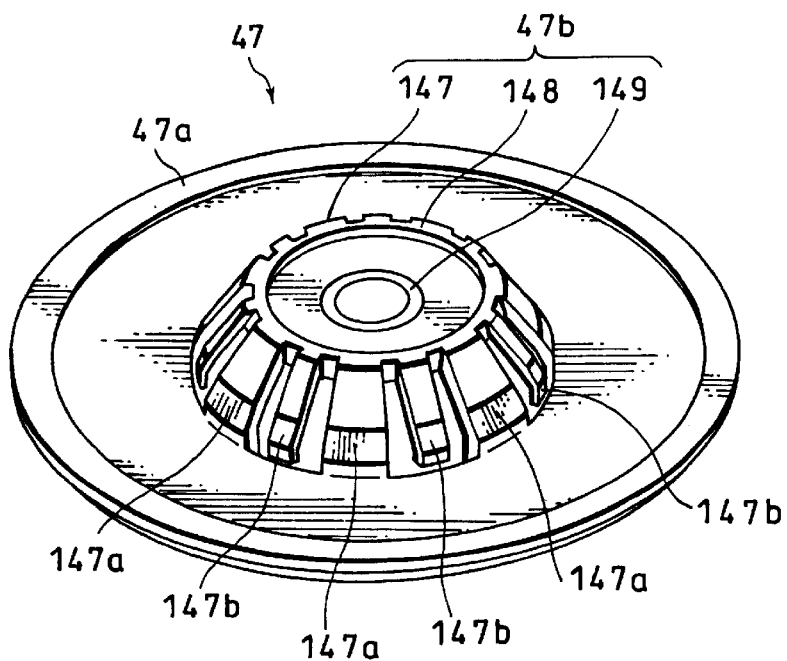
Figure 8B:
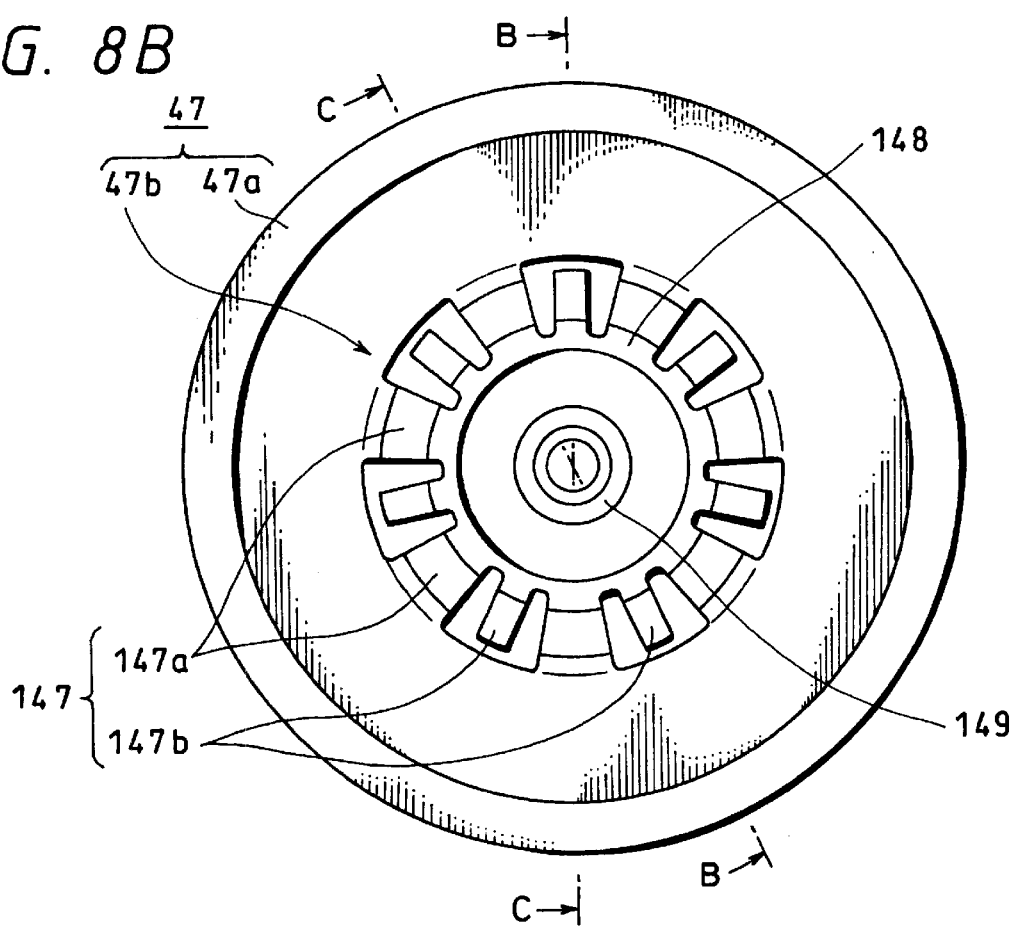
Figure 9A:
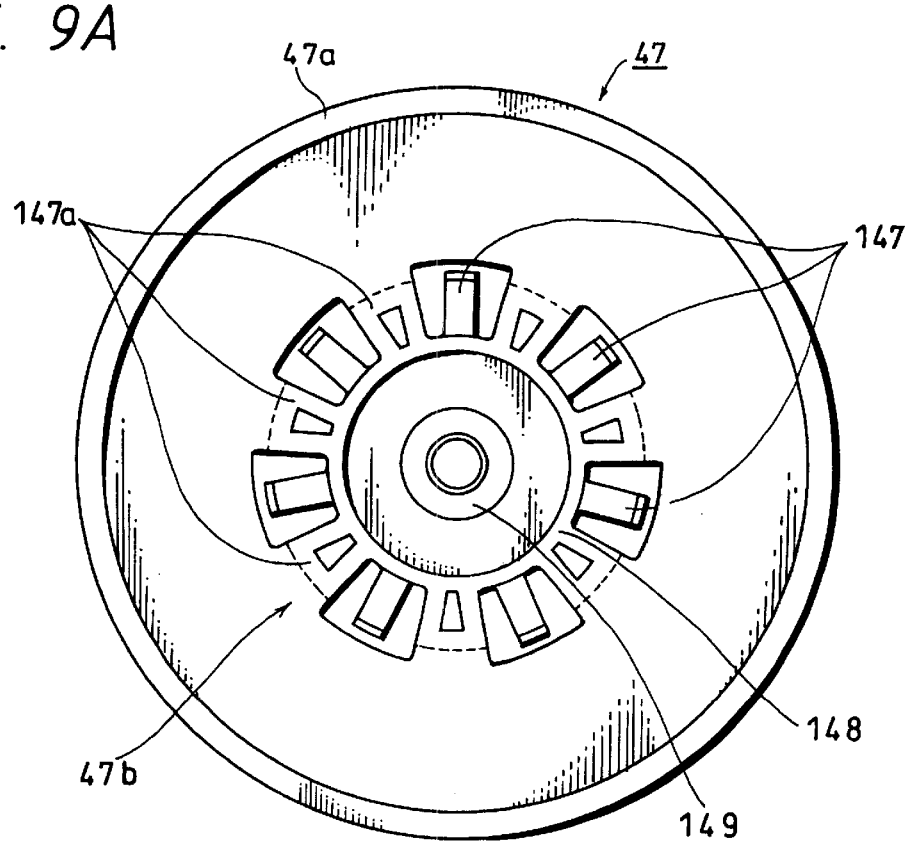
Figure 9B:
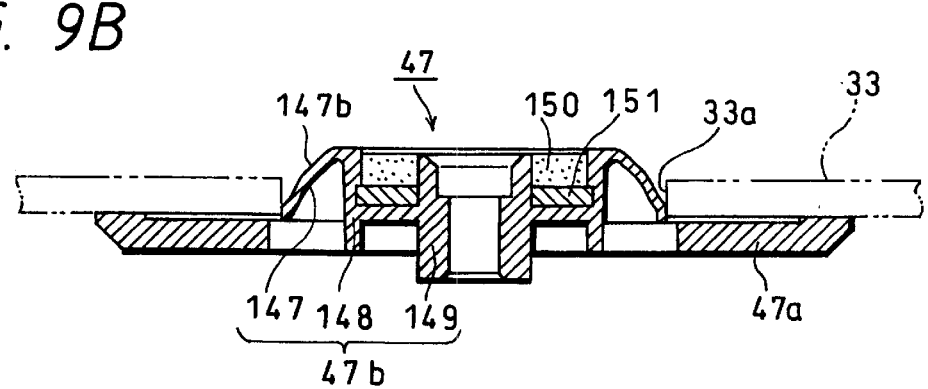
Figure 9C:
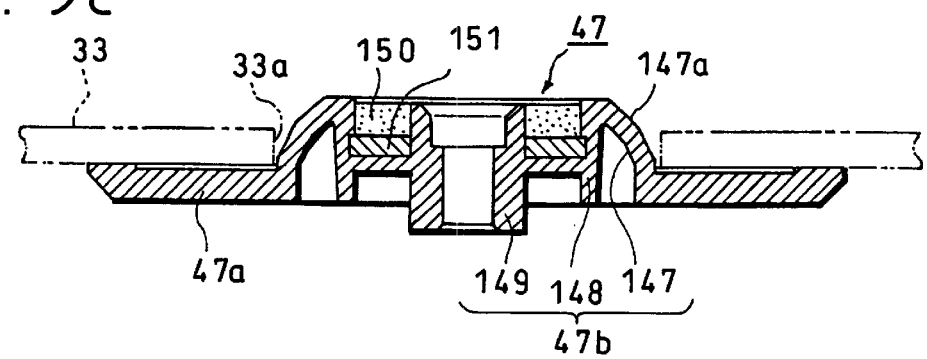
Figure 10:
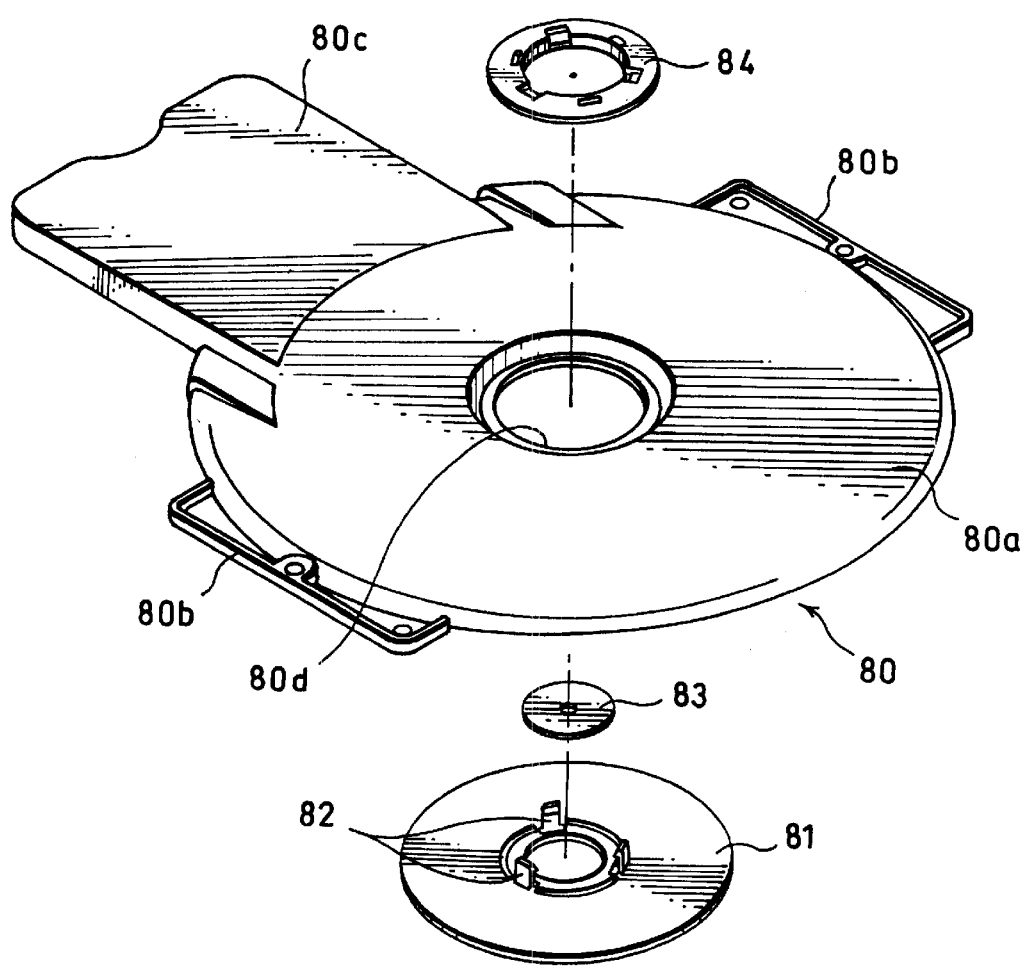
FIG. 10 is an enlarged perspective view of an essential portion in FIG. 2, showing a chuck holder and the like of a disk drive of the present invention.
Figure 11:
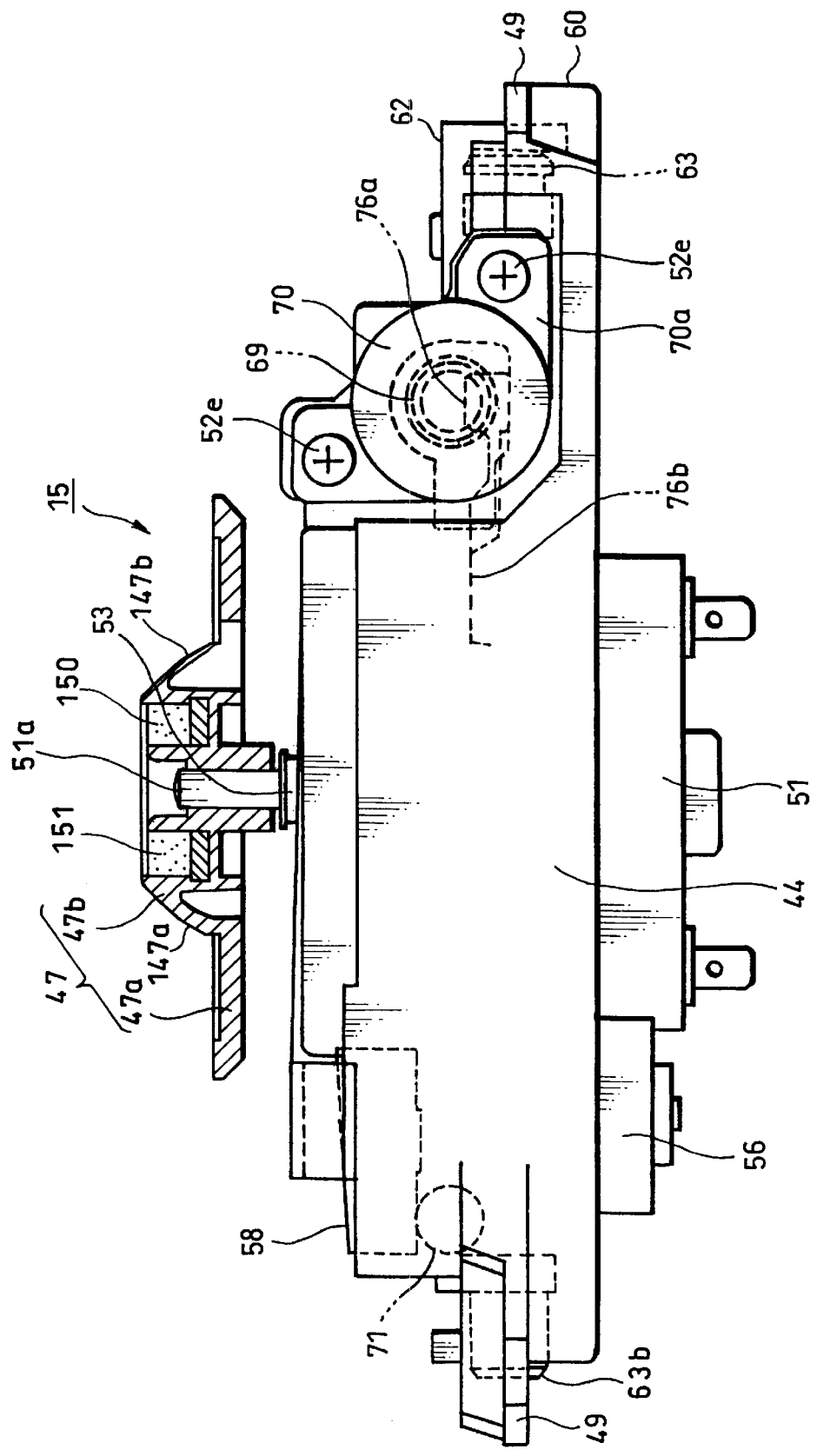
FIG. 11 shows a base unit of a disk drive of the present invention, which is a front sectional view of a turntable.

7 is a disassembled perspective view of the base unit in FIG. 5, FIGS. 8A and 8B and FIGS. 9A to 9C are illustrations showing turntables, FIG. 10 is a perspective view showing a chuck plate and the like, and FIG. 11 is a front view of the base unit in FIG. 5.

Figure 12:
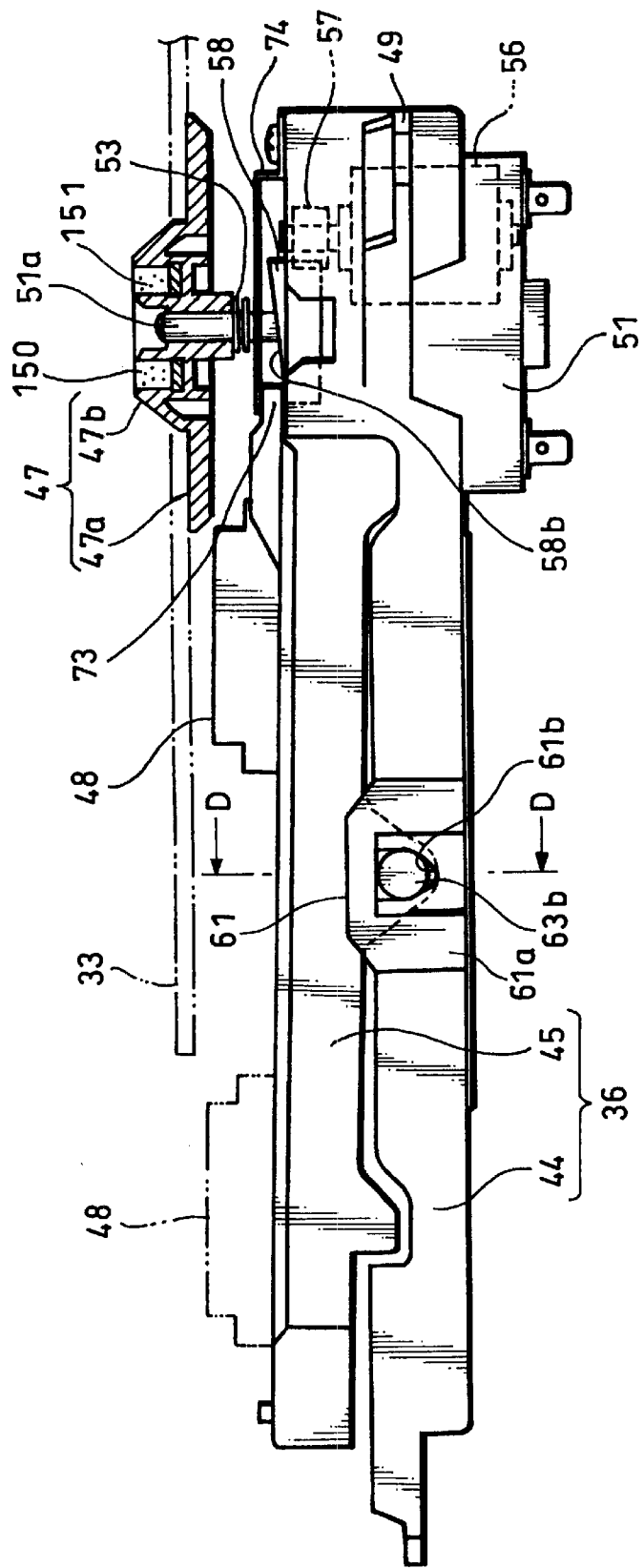
FIG. 12 shows a base chassis of a disk drive of the present invention, which is a side view of a pickup chassis when tilted forward.
Figure 13:
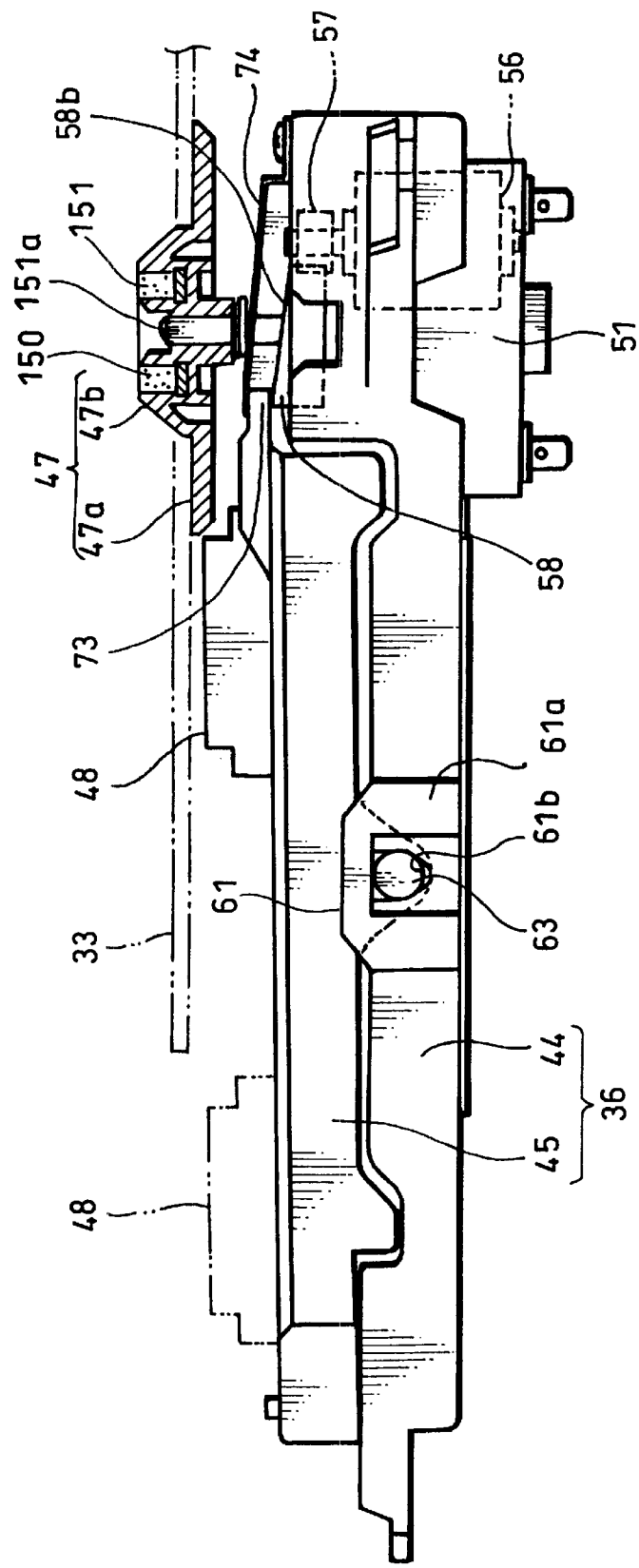
FIG. 13 shows a base chassis of a disk drive of the present invention, which is a side view of a pickup chassis when tilted backward.
Figure 14:
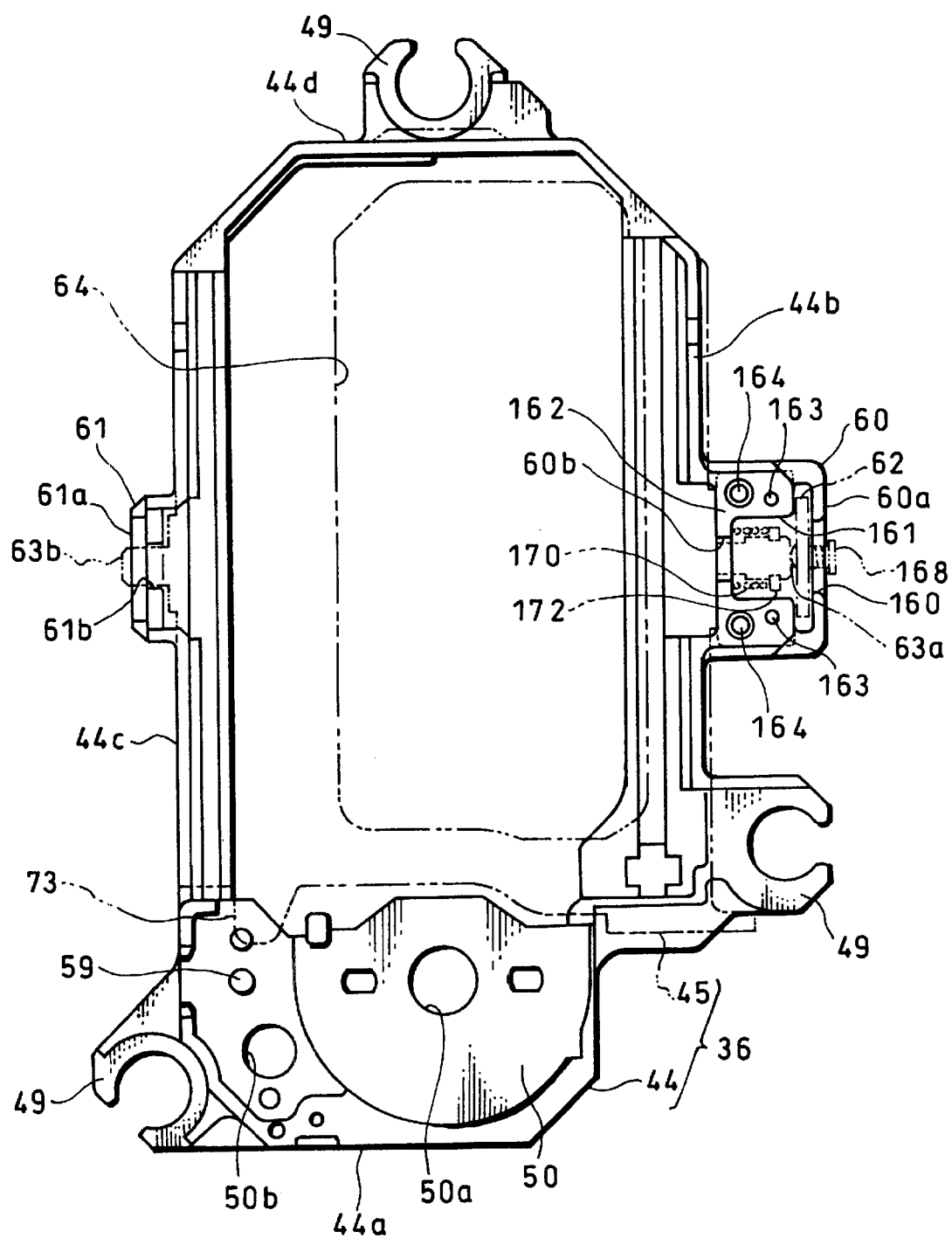
FIG. 14 is a top view showing a spindle chassis of a disk drive of the present invention.
Figure 15:
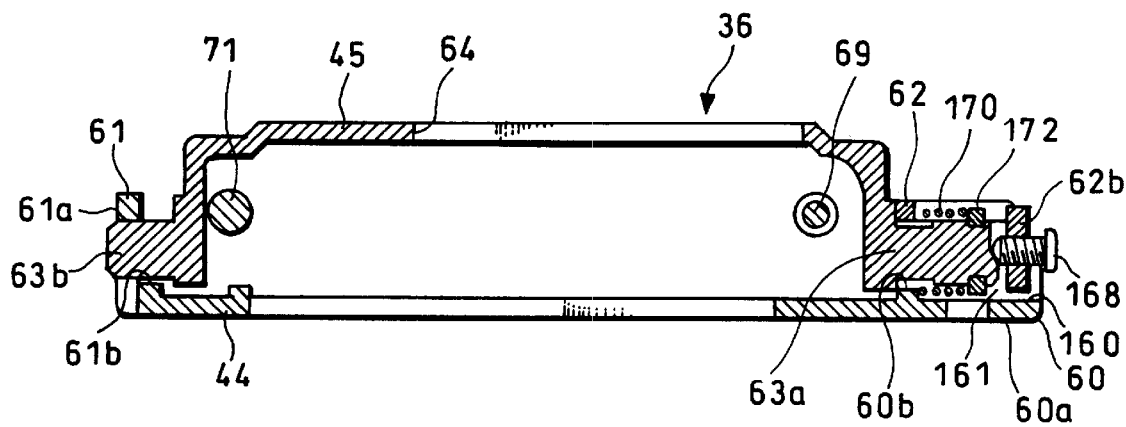
FIG. 15 is a sectional view of the base chassis in FIG. 12, taken along the line D—D in FIG. 12.
Figure 16:
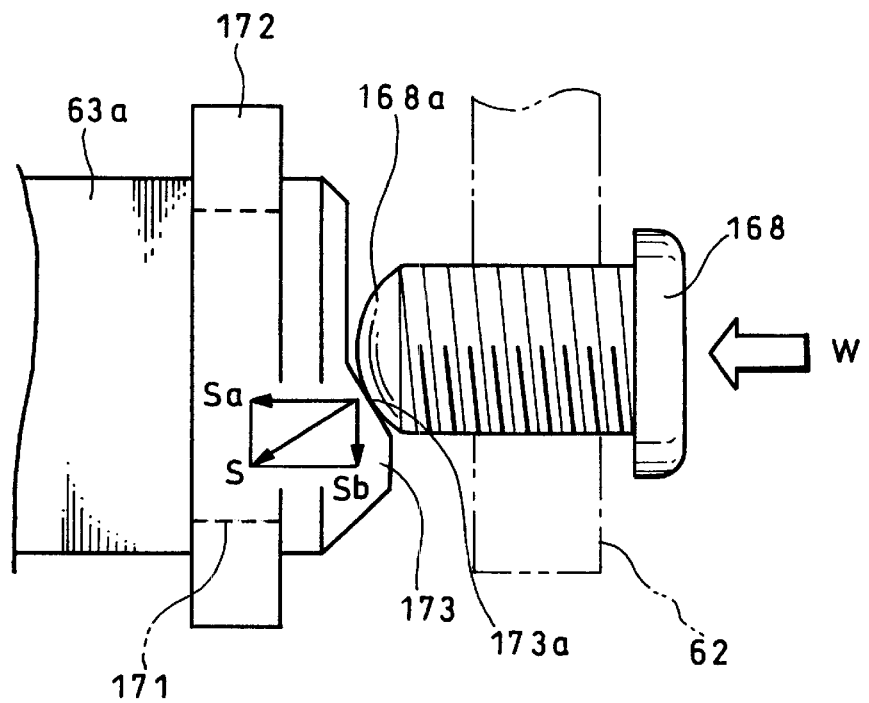
FIG. 16 is an illustration of an enlarged essential portion in FIG. 15.
Figure 17:
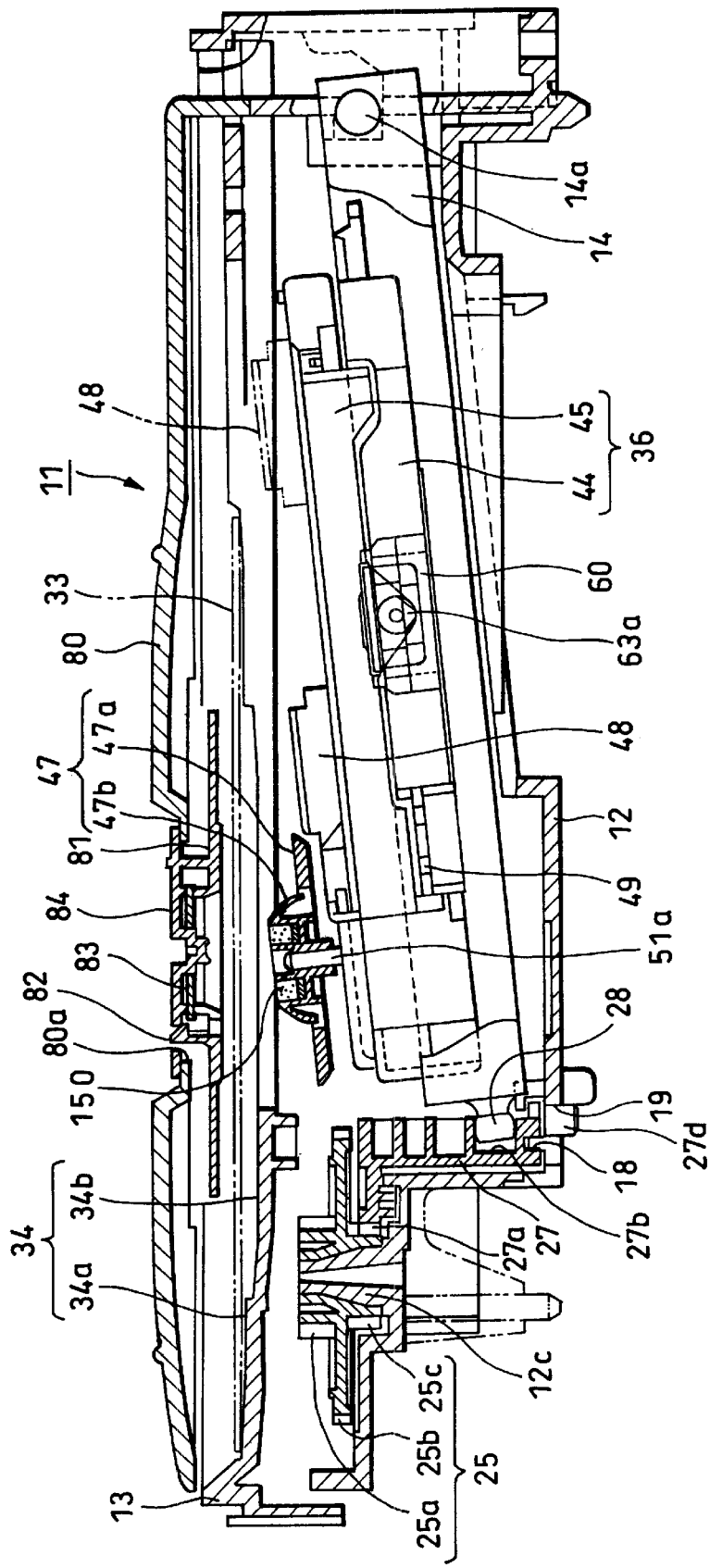
FIG. 17 shows a disk drive of the present invention sectioned in the tray carrying direction, which is a sectional view of the disk drive under an unloading state when a turntable lowers.
Figure 18:
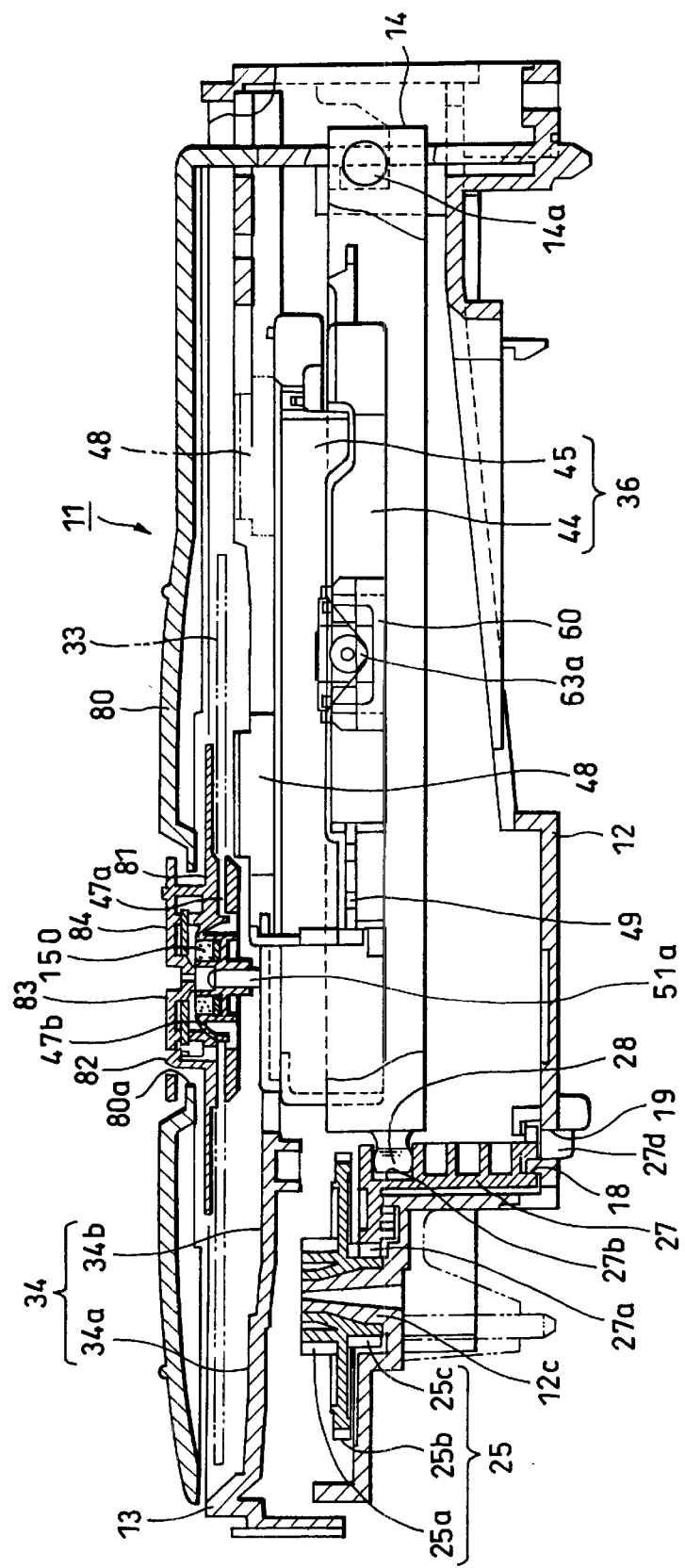
FIG. 18 shows a disk drive of the present invention sectioned in the tray carrying direction, which is a sectional view of the disk drive under an unloading state when a turntable rises.
Figure 19:
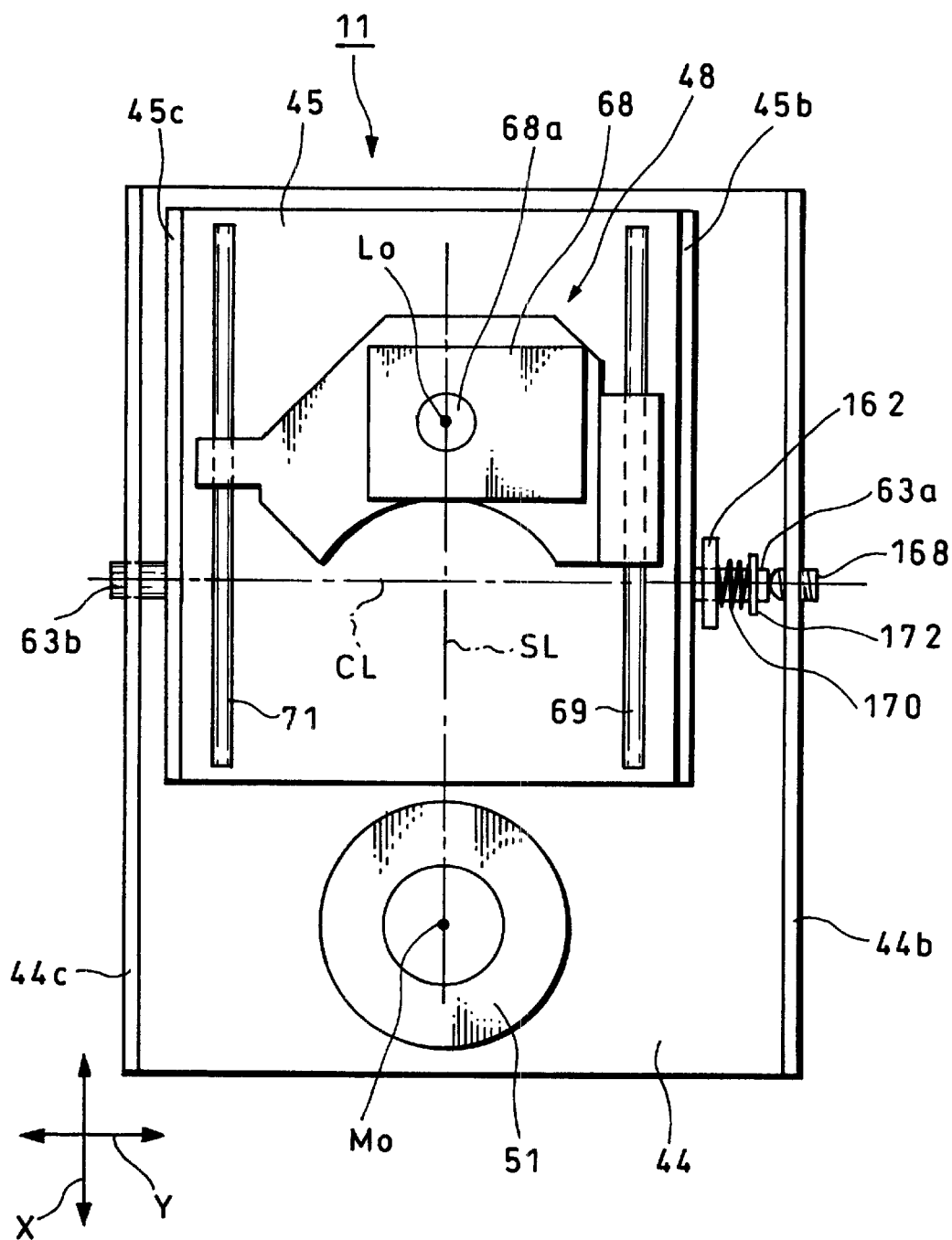
FIG. 19 is an illustration showing a schematic configuration of a disk drive of the present invention.
Figure 20:
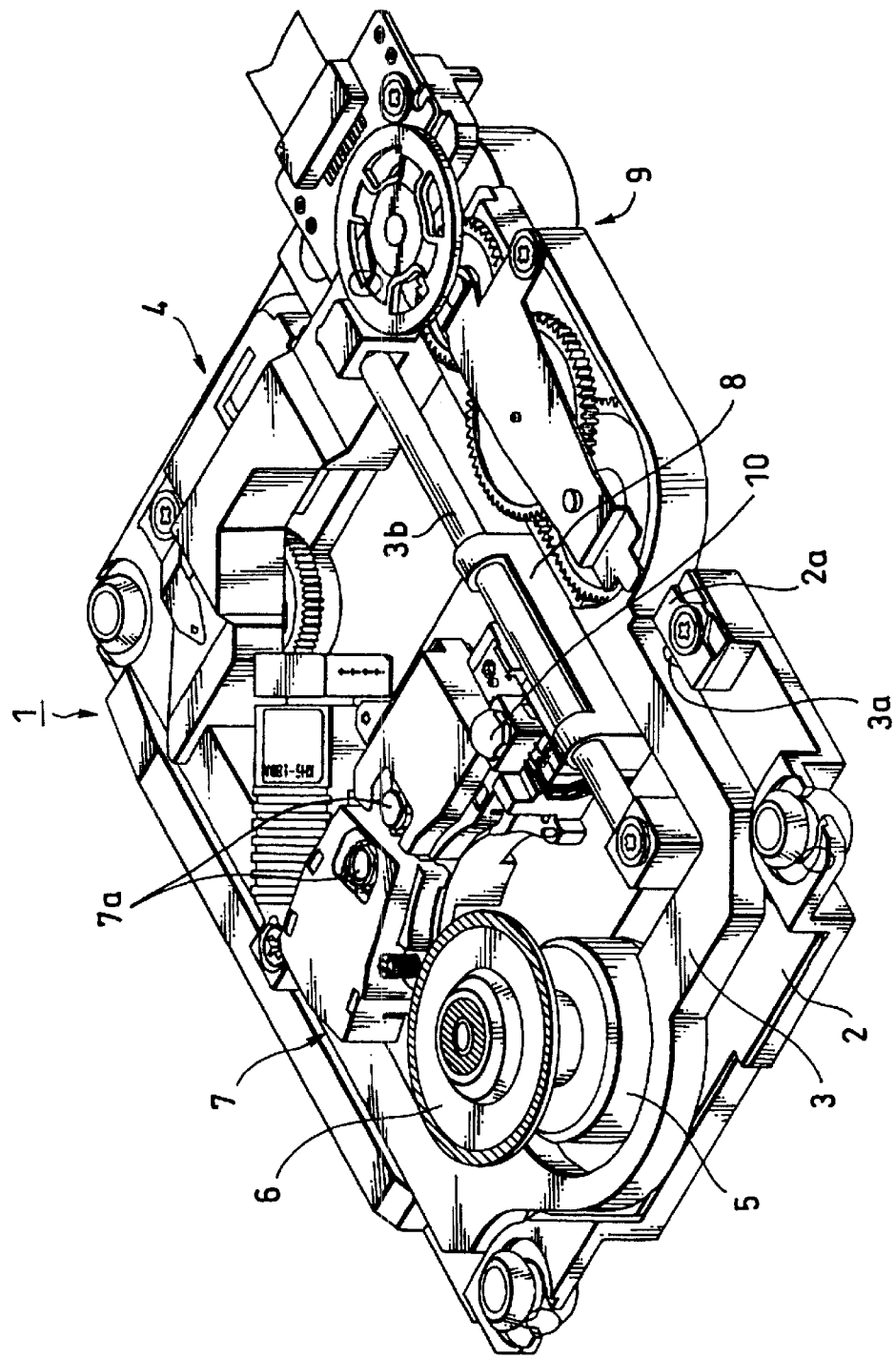
FIG. 20 is a perspective view showing a conventional disk drive.
Figure 21A:
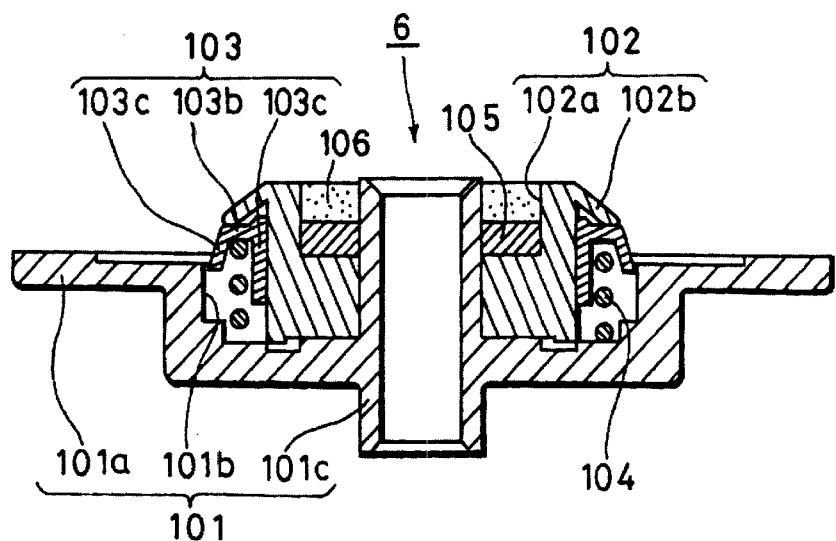
Figure 21B:
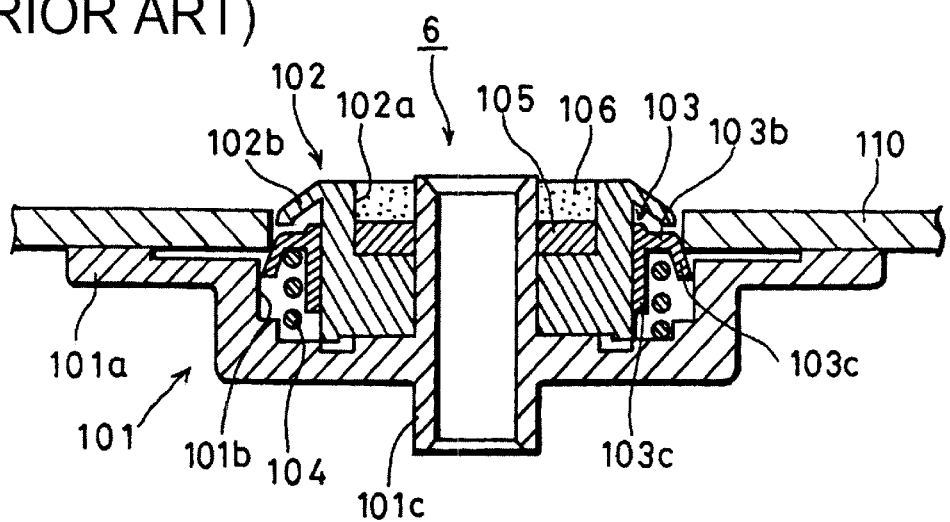

Moreover, FIGS. 12 to 15 show a base unit of the present invention, in which FIG. 12 is a side view showing a state of tilting a pickup chassis forward, FIG. 13 is a side view showing a state of tilting the pickup chassis backward, FIG. 14 is a top view showing the relation between a spindle chassis and the pickup chassis, FIG. 15 is a sectional view taken along the line D—D in FIG. 12. FIG. 16 is an illustration showing an essential portion of FIG. 15. Furthermore, FIGS. 17 and 18 are sectional views of a disk drive of the present invention in the disk-tray moving direction, in which FIG. 17 a longitudinal sectional view showing an unloading state and FIG. 18 is a longitudinal sectional view showing a loading state. FIG. 19 is an illustration showing a schematic configuration.

As shown in FIGS. 1 and 2, a disk drive 11 of the present invention comprises a box-type main chassis 12 opening at the upper face and the front face, a disk tray 13 to be removed or inserted from the front opening of the main chassis 12, a base holder 14 stored in a recessed portion of the main chassis 12 and supported so that it can be oscillated, and a base unit 15 elastically supported by the base holder 14.

As shown by an enlarged view in FIG. 3, the main chassis 12 is constituted of a shallow-bottom quadrangular box and almost-quadrangular recessed portion 16 extending up to the rear end is formed at the central portion of the bottom face of the main chassis 12. The bottom face of the recessed portion 16 is formed into a forward-lowering slope and a pair of bearing portions 17 and 17 opening upward are provided for the both ends of the disk tray 13 in the crosswise direction Y horizontally orthogonal to the longitudinal direction X which is the removing/inserting direction of the tray 13 at the rear end of the tray 13. A pair of shaft portions 14a and 14a provided for the rear ends of the both side faces of the base holder 14 are rotatably journaled by the bearing portions 17 and 17. Moreover, guide protrusion 18 and a slot 19 extended in parallel with each other in the crosswise direction Y are provided for the front end of the recessed portion 16.

Moreover, a motor seat 12a is provided for one side of the bottom front end enclosing the recessed portion 16 of the main chassis 12. A loading motor 20 is screwed to the seat 12a at the back of the main chassis 12. A rotating shaft 20a of the loading motor 20 passes through the bottom face of the main chassis 12 and protrudes into the recessed portion 16 and a driving pulley 21 is fixed to the rotating shaft 20a. One end of a rubber belt 22 is hung on the driving pulley 21 as a power transmission member and a driven pulley 23 set to almost central portion of the bottom front end is hung on the other end of the rubber belt 22.

The driven pulley 23 is rotatably supported by a first support shaft 12b vertically set to the bottom front end of the main chassis 12 and removal of the pulley 23 is prevented by a set screw 24 screwed to the first support shaft 12b. A not-illustrated gear is integrally formed on the bottom face of the driven pulley 23 and a middle gear 25b of an intermediate gear 25 is engaged with the not-illustrated gear. The intermediate gear 25 is rotatably supported by a second support shaft 12c vertically set to the bottom front end. A driving gear 26 rotatably supported by a third support shaft 12d vertically set to the bottom front end is engaged with an upper gear 25a provided for the upper face of the middle gear 25b of the intermediate gear 25.

Moreover, as shown in FIG. 17, a lower gear 25c is integrally provided for the bottom face of the middle gear 25b of the intermediate gear 25. A rack 27a of a chuck cam 27 is engaged with the lower gear 25c. As shown in FIG. 3 and the like, the chuck cam 27 is constituted of a block-shaped member formed into a transversely-long rectangle and a rack 27a protruding to one side of the cam 27 is formed on the upside of the cam 27. Moreover, a guide groove longitudinally extended is formed on the lower face of the chuck cam 27. Furthermore, a cam groove 27b for vertically oscillating the base holder 14 is provided for the face opposite to the rack 27a of the chuck cam 27.

The cam groove 27b of the chuck cam 27 has upper and lower horizontal portions set to the longitudinal both ends and a slope diagonally communicating with the upper and lower horizontal portions. A cam pin 28 provided for the front end of the base holder 14 so as to protrude forward is slidably engaged with the cam groove 27b. Moreover, operation pins 27c and 27d for manually sliding the chuck cam 27 are provided for the upper and lower faces of the chuck cam 27. The lower operation pin 27d passes through the slot 19 of the main chassis 12 and protrudes to the back of the chassis 12. A spring receiving piece 27e is provided for the proximal end of the upper operation pin 27c and one end of an extension coil spring 29 is secured to the spring receiving piece 27e.

The other end of the extension coil spring 29 is secured to a spring receiving piece 12e provided for the seat 12a of the main chassis 12. The chuck cam 27 is always extended toward the seat 12a by the spring force of the extension coil spring 29. Therefore, when the chuck cam 27 is located at the end of the extension coil spring 29 close to the seat 12a, the cam pin 28 is present at the lower horizontal portion of the cam groove 27b and the base holder 14 is kept in a forward-lowering state. When the chuck cam 27 is located at the end separate from the seat 12a against the spring force of the extension coil spring 29, the cam pin 28 is present at the upper horizontal portion of the cam groove 27b and the base holder 14 is kept almost horizontal.

Moreover, the front opening of the main chassis 12 serves as a tray gate 30. A plurality of tray guides 31 are provided for inner faces of side pieces enclosing the both sides of the tray gate 30 and a plurality of guide pins 32a and 32b are provided for bottom pieces. By controlling a pair of guide rails 13a and 13a by the tray guides 31 and the guide pins 32a and 32b provided for the both sides of the disk tray 13, the disk tray 13 is held so that it can be moved in the longitudinal direction X of the main chassis 12 and removed from or inserted into the tray gate 30.

As shown in FIG. 4 and the like, the disk tray 13 is provided with a disk storage portion 34 constituted of a circular recessed portion capable of horizontally storing an optical disk 33 such as a CD or CD-ROM showing an embodiment of a discoid recording medium and a slot-shaped opening 35 formed so as to extend backward along a tray center from the central portion of the disk storage portion 34. The disk storage portion 34 has a large-diameter portion 34a on which an optical disk 33 having a diameter of 12 cm is mounted and has a small-diameter portion 34b which is constituted of a concave portion formed at the central portion of the large-diameter portion 34a and on which an optical disk 33 having a diameter of 8 cm is mounted.

Moreover, the opening 35 of the disk tray 13 is formed from a position further than the central portion of the small-diameter portion 34b and extended up to the outside of the disk storage portion 34 by cutting out a part of the large-diameter portion 34a. The size and shape of the opening 35 are designed so that the upper portion of the base unit 15 can be completely stored. A pair of right and left guide rails 13a and 13a extending in the longitudinal direction in parallel are provided for the right and left ends of the disk tray 13. Furthermore, though not illustrated, a rack and a guide groove extending in parallel with the guide rail 13a are integrally provided for one side of the lower face of the disk tray 13.

The driving gear 26 supported by the main chassis 12 is engaged with the rack of the disk tray 13 and the disk tray 13 is moved forward or backward by the torque of the driving gear 26. The length of the rack is set so that the rack is disengaged from the driving gear 26 when the disk tray 13 moves up to a position immediately before the rearmost end. Moreover, the guide pin 32a is vertically set to the front portion of the main chassis 12 is slidably engaged with the guide groove of the disk tray 13 and movement of the disk tray 13 is controlled also by the guide pin 32a so as to linearly move in the longitudinal direction X.

As shown in FIG. 3 and the like, longitudinal movement of the disk tray 13 is detected by a tray feed detection switch 37. In accordance with movement of the tray feed detection switch 37, it is possible to detect whether the disk tray 13 moves in the eject direction for ejecting the optical disk 33 or in the set direction for carrying the optical disk 33 to a disk setting portion. A working element 37a of the tray feed detection switch 37 passes through a through-hole formed on the main chassis 12 and protrudes beyond a moving trace of the disk tray 13. The tray feed detection switch 37 is fixed to a printed circuit board 38 set to the lower face of the main chassis 12.

A connection terminal 39 for supplying power to the loading motor 20 and the like and a cam detection switch 40 for detecting an operation of a check cam 27 are set to the printed circuit board 38. A working element 40a of the cam detection switch 40 is set on a moving trace of an input portion 27f provided for the check cam 27. Moreover, when the check cam 27 moves to a direction separate from the seat 12a by a predetermined distance, the cam detection switch 40 is turned on. Symbol 41 shown in FIG. 3 denotes a cover plate set to the lower face of the main chassis 12.

The base holder 14 stored in the recessed portion 16 of the main chassis 12 has the shape shown in FIG. 5 and the like. That is, the base holder 14 is constituted of an almost-quadrangular box having a shallow bottom, the cam pin 28 is provided for a front plate of the holder 14, and a pair of shaft portions 14a is provided for rear ends of right and left side plates of the holder 14. An opening 42a for avoiding contact with a spindle motor and the like and an opening 42b for passing a flexible printed circuit board and the like are formed on the bottom plate of the base holder 14. Moreover, a convex portion 14b for positioning and elastically supporting the base unit 15 is formed at three positions on the upper face of the bottom plate. An insulator 43 formed like a gourd by a rubber-like elastic body made of rubber or plastic is set to the convex portion 14b.

Figure 7:
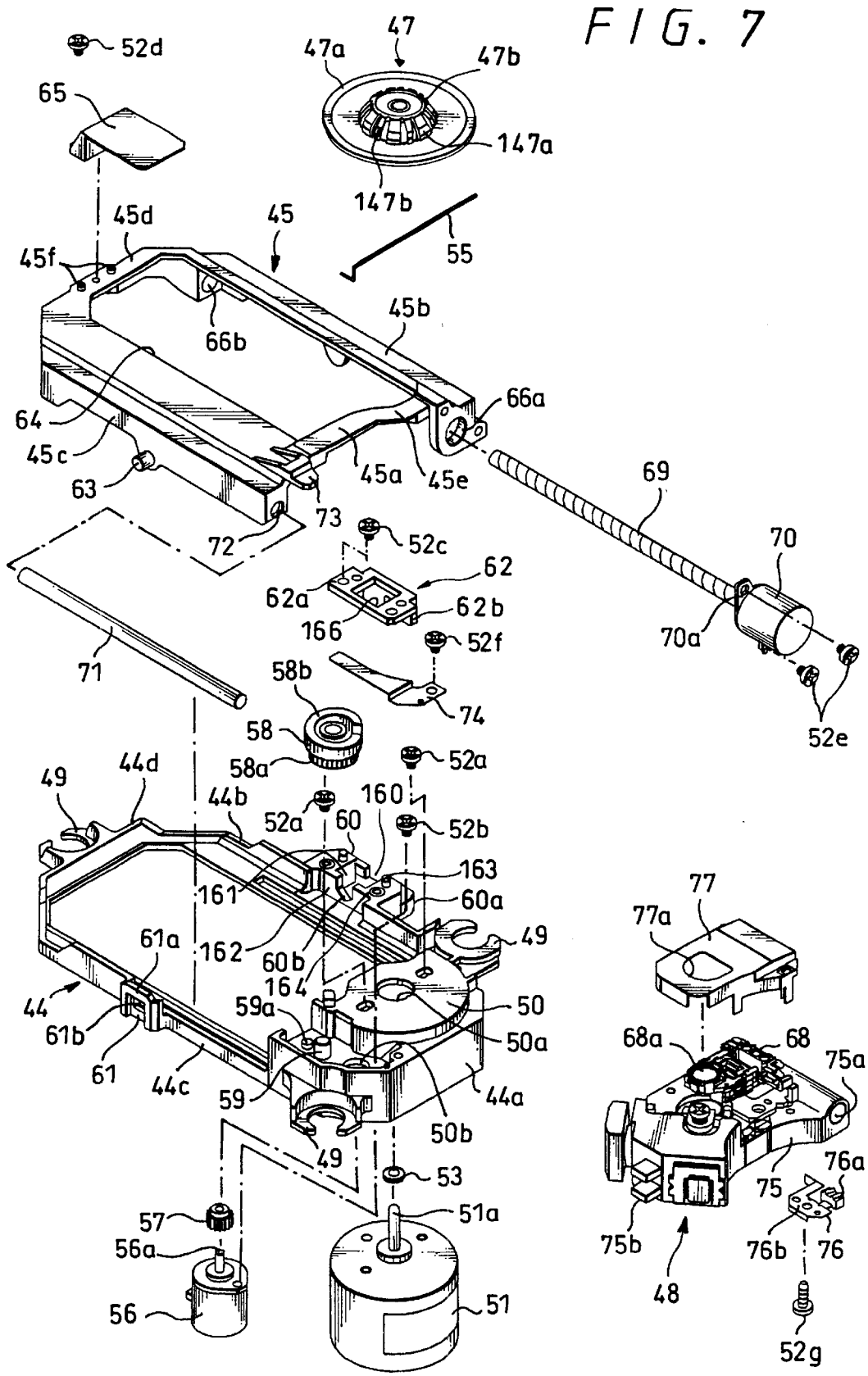
FIG. 7 is a disassembled perspective view of a base unit of a disk drive of the present invention.

The base unit 15 is constituted as shown in FIGS. 5 to 7. That is, the base unit 15 is provided with a spindle chassis 44 for rotatably supporting a turntable 47 to which the optical disk 33 used to reproduce an information signal is set and a pickup chassis 45 for movably supporting an optical pickup 48 showing an embodiment of a pickup for reading an information signal from the optical disk 33 set to the turntable 47. A base chassis 36 is constituted of the spindle chassis 44 and the pickup chassis 45.

As shown in FIG. 7, the spindle chassis 44 of the base chassis 36 is constituted of a frame-shaped member having a front piece 44a, right and left side pieces 44b and 44c, and a rear piece 44d and only the front piece 44a is set to a position approx. 2 times higher than other pieces. A support portion 49 for supporting the insulator 43 is provided for such three positions as one corner of the front piece 44a, the front end of the side piece 44b located at the opposite side to the corner, and almost central portion of the rear piece 44d. The support portion 49 is formed like a planar C-shaped pawl and a bound portion of the insulator 43 is inserted into the support portion 49. Moreover, by inserting a not-illustrated setscrew into the insulator 43 from its upper portion and screwing a screw portion at the front end into a tapped hole formed on the upper face of the convex portion 14b, the base unit 15 is elastically supported by the base holder 14 through the three insulatans 43.

Moreover, a spindle-motor setting seat 50 is provided for the front piece 44a of the spindle chassis 44 by extending a part of the front piece 44a upward. A spindle motor 51 is set to the inside of the motor setting seat 50 and fastened and fixed by a plurality of setscrews 52a and integrated with the seat 50. The rotating shaft 51a of the spindle motor 51 passes through a through-hole 50a of the motor setting seat 50 and protrudes beyond the spindle chassis 44. An offset washer 53 is fitted and fixed to the rotating shaft 51a of the spindle motor 51. Moreover, the turntable 47 is fitted and fixed onto the offset washer 53.

The turntable 47 is constituted as shown in FIGS. 8A and 8B and FIGS. 9A to 9C. That is, as shown in FIG. 8A, the turntable 47 is constituted by uniting a mounting portion 47a on which the margin of a center hole 33a of the optical disk 33 and a fitting portion 47b to be fitted to the center hole 33a into one body. The mounting portion 47a of the turntable 47 is formed into a disk having a diameter slightly larger than that of the center hole 33a of the optical disk 33. The fitting portion 47b is provided for the central portion of the mounting portion 47a so as to protrude to one side of the portion 47a. The height of the fitting portion 47b is set to a value slightly larger than the thickness of the optical disk 33.

The fitting portion 47b is provided with an outer-periphery portion 147 which is tapered and almost conical, a cylindrical portion 148 connected with the tapered side of the outer-periphery portion 147, and a boss portion 149 concentrically set to the inside of the cylindrical portion 148. The rotating shaft 51a of the spindle motor 51 is inserted into the hole of the boss portion 149 and set through fixing means such as press-fitting means and integrated with the portion 149 in the rotating direction. An annular concave portion is formed between the cylindrical portion 148 and the boss portion 149 and an annular magnet 150 and yoke plate 151 are stored in the concave portion.

As shown in FIGS. 8B and 9A, the outer-periphery portion 147 of the fitting portion 47b is constituted of a plurality of fixed pieces 147a radially arranged outside of the cylindrical portion 148 about the boss portion 149 and a plurality of elastic pieces 147b radially arranged outside of the cylindrical portion 148 and respectively set between adjacent fixed pieces 147a. These fixed pieces 147a and elastic pieces 147b are alternately arranged in the circumferential direction by keeping a predetermined angular interval. Moreover, the fixed pieces 147a and elastic pieces 147b are respectively curved so as to be convex outward. One ends of these fixed pieces 147a and elastic pieces 147b are continuously and integrally connected to the cylindrical portion 148.

The flared other ends of the fixed pieces 147*a* are continuously and integrally connected to the mounting portion 47*a* as shown in FIG. 9C. Moreover, each fixed piece 147*a* is constituted so as to securely guide the center hole 33*a* of the optical disk 33 by providing a sufficient thickness to the piece 147*a* to secure a proper rigidity. As shown in FIG. 9B, however, the other end of each elastic piece 147*b* is formed into a free end at the mounting portion-47*a* side and extended outward in radial direction. Moreover, each elastic piece 147*b* is constituted so that it has elasticity by properly decreasing its thickness and the front end of the free end is pressure-welded to the inner periphery of the center hole 33*a*.

As a result, the diameter of a circle contacting with front ends of free ends of all elastic pieces 147*b* are set to a value slightly larger than the diameter of the center hole 33*a* of the optical disk 33. Because free ends of the elastic pieces 147*b* are pressure-welded to the inner periphery of the center hole 33*a* at a plurality of positions, the optical disk 33 is centered to the turntable 47 and positioned. The diameter of the circle contacting with the fixed ends of the fixed pieces 147*a* at the mounting portion-47*a* side is set to a value slightly smaller than the diameter of the center hole 33*a*. ABS resin (acrylonitrile butadiene styrene resin) is preferred as the material of the turntable 47 having the above constitution. However, it is a matter of course that other synthetic resins can be used.

Symbol 55 shown in FIG. 7 denotes an offset spring for controlling axial movement of the rotating shaft 51*a*. The offset spring 55 is set so as to cross the motor setting seat 50, the middle portion of the spring 55 is engaged with the offset washer 53, and the both ends of the spring 55 is secured to the motor setting seat 50. Moreover, a tilt motor 56 is set to the inside of the motor setting seat 50 so to be transversely arranged with the spindle motor 51.

The tilt motor 56 is fastened and fixed by one setscrew 52*b* and integrated. The rotating shaft 56*a* of the tilt motor 56 passes through a hole 50*b* of the motor setting seat 50 and protrudes beyond the spindle chassis 44. A tilt gear 57 is fitted and fixed to the rotating shaft 56*a* of the tilt motor 56 and a gear portion 58*a* of a tilt cam 58 is engaged with the tilt gear 57. The tilt cam 58 is rotatably supported by a support shaft 59 vertically set to the upper face of the front piece 44*a*. A spirally-extended cam face 58*b* is provided for the upper face of the tilt cam 58 and the pickup chassis 45 is vertically oscillated by a value equivalent to the height-directional stroke of the cam face 58*b*.

Moreover, sectional forms of the side pieces 44*b* and 44*c* and rear piece 44*d* of the spindle chassis 44 are respectively formed into an L-shape over almost the entire length in the longitudinal direction so as to improve the rigidity of the whole of the spindle chassis 44. Moreover, a pair of bearing portions 60 and 61 are provided for almost central portion between the side pieces 44*b* and 44 in the longitudinal direction so as to extend in the transverse direction. A pair of shaft portions 63*a* and 63*b* provided for the pickup chassis 45 is rotatably held by the first and second bearing portions 60 and 61.

As shown in FIG. 7 and FIGS. 12 to 15, the first bearing portion 60 greatly extends outward and has a box-shaped box margin 60*a* opened upward and a V-shaped bearing face 60*b* provided in the box margin 60*a*. A cutout 160 opened upward is provided for the side face of the box margin 60*a*. A concave portion 161 of the box margin 60*a* is opened on the side face through the cutout 160. The concave portion 161 of the box margin 60*a* is formed into T-shape turning the cutout-160 side upward, a partition wall 162 is provided for the bottom portion of the box margin 60*a*, and the bearing face 60*b* is formed on the partition wall 162. Positioning pins 163 and 163 and tapped holes 164 and 164 respectively paired each other are provided for broad portions at the both sides of the partition wall 162. One shaft portion 63*a* of the pickup chassis 45 is mounted on the bearing face 60*b* of the first bearing portion 60. By pressing the shaft portion 63*a* by a pressing piece 62 from the upper side, removal of the shaft portion 63*a* is prevented.

Moreover, the second bearing portion 61 has a portal bearing margin 61*a* slightly extending outward and opened at the side face and a V-shaped bearing face 61*b* provided in the bearing margin 61*a*. The other shaft portion 63*b* of the pickup chassis 45 is mounted on the bearing face 61*b* of the second bearing portion 61. By inserting the shaft portion 63*b* between the bearing face 61*b* and the bearing margin 61*a* from the inside of the spindle chassis 44, the shaft portion 63*b* is rotatably supported by the second bearing portion 61 while removal of the portion 63*b* is prevented.

As shown in FIG. 7, the pressing piece 62 has a fixed portion 62*a* at whose central portion an opening window 166 is formed and a support portion 62*b* bent up to 90° from the fixed portion 62*a*. The fixed portion 62*a* of the pressing piece 62 is provided with a positioning hole with which a pair of positioning pins 163 of the first bearing portion 60 is engaged and a through-hole opened correspondingly to a pair of tapped holes 164. As shown in FIGS. 14 and 15, a tapped hole piercing sideward is formed at almost central portion of the support portion 62*b* of the pressing piece 62. An adjusting screw 168 is screwed into the tapped hole while turning the head portion outward.

The fixed portion 62*a* of the pressing piece 62 is mounted on the upper face of the partition wall 162 and the support portion 62*b* is inserted into the concave portion 161. Moreover, the pressing piece 62 is fastened and fixed to the first bearing portion 60 by a setscrew 52*c* shown in FIG. 7. Removal of the shaft portion 63*a* is prevented by the pressing piece 62 and the position of the pickup chassis 45 is adjusted to the spindle chassis 44 by the adjusting screw 168.

The pickup chassis 45 is formed at almost the same size as the spindle chassis 44 so that the top view of the chassis 45 becomes almost equal to that of the spindle chassis 44 excluding the front piece 44*a*. That is, the pickup chassis 45 is set behind the front piece 44*a* of the spindle chassis 44 and constituted of frame-shaped members having a front piece 45*a* adjacent to the front piece 44*a*, a pair of side pieces 45*b* and 45*c* faced each other at right and left, and a rear piece 45*d* continued backward. Moreover, an opening 64 through which an optical head 68 of the optical pickup 48 passes is provided inside of these frame-shaped members.

Furthermore, sectional forms of the side pieces 45*b* and 45*c* and the rear piece 45*d* excluding the front piece 45*a* of the pickup chassis 45 are respectively formed into an L-shape over almost entire length in the longitudinal direction so as to improve the rigidity of the whole of the pickup chassis 45. Heights of the side pieces 45*b* and 45*c* and the rear piece 45*d* are set to a value almost equal to the height of the side piece 44*b* of the spindle chassis 44. Therefore, by superimposing the pickup chassis 45 on a predetermined position of the spindle chassis 44, the height of the superimposed portion becomes almost equal to the height of the front piece 44*a* of the spindle chassis 44.

The front piece 45*a* of the pickup chassis 45 is formed like a plate so as to connect the right and left side pieces 45*b* and 45c by only the upper face. Moreover, a slope 45e lowering one side piece 45b is provided for the upper face of the front piece 45a so as to tilt in the transverse direction which is the extending direction of the front piece 45a. Thus, by providing the slope 45e for the front piece 45a of the pickup chassis 45, it is possible to decrease the number of parts compared to the case of a conventional base chassis, improve the assembling characteristic, and thereby simplify the assembling operation.

A pair of shaft portions 63a and 63b is provided for almost central portion in the longitudinal direction of the side pieces 45b and 45c of the pickup chassis 45 so as to protrude outward by making center shaft lines of the shaft portions 63a and 63b coincide with each other. As shown in FIGS. 14 and 15, the first shaft portion 63a is formed slightly diagonally from the second shaft portion 63b and a compression coil spring 170 showing an embodiment of an elastic body is loosely fitted to the portion 63a. An annular groove 171 continued in the circumferential direction is provided for the tip of the second shaft portion 63b and a retaining ring 172 is fitted to the annular groove 171. One end of the compression coil spring 170 is seated to the retaining ring 172 and the other end of it is seated to the partition wall 162.

The pickup chassis 45 is always pressed against one side piece 44b of the spindle chassis 44 by the spring force of the compression coil spring 170. Moreover, the end face of the first shaft portion 63a is brought into contact with the front end of the adjusting screw 168. As shown by an enlarged view in FIG. 16, an adjusting portion 173 for reducing a backlash of a bearing portion by pressing the first shaft portion 63a against the bearing face 60b is provided for the end face of the first shaft portion 63a. The adjusting portion 173 has an adjusting slope 173a to be brought into contact with the front end 168a of the adjusting screw 168 so as to reduce the backlash of the bearing portion by generating a component force Sb acting in a direction intersecting with a shaft direction by the adjusting slope 173a.

The adjusting portion 173 having the above action can be easily formed by forming the front end of the shaft portion like a cone, linearly cutting off the front end in the diametral direction, and forming a gradient face. According to the adjusting portion 173, it is possible to generate an orthogonal-directional component force Sb in a direction orthogonal to the shaft center line direction of the shaft portion 63a in accordance with an external force W acting in the shaft center line direction and reduce a backlash of a bearing portion in accordance with the orthogonal-directional component force Sb. That is, when it is assumed that an acting force S acts in the direction vertical to the adjusting slope 173a with which the front end 168a of the adjusting screw 168 contacts by applying a shaft-center-line-directional external force W to the end face of the shaft portion 63a by the adjusting screw 168, a shaft-directional component force Sa of the acting force S is produced in the shaft-center-line direction and an orthogonal-directional component force Sb is produced in the direction orthogonal to the shaft-center-line direction. The shaft portion 63a is pressed against the bearing face 60b by the orthogonal component force Sb and the backlash of the bearing portion is absorbed.

Moreover, as shown in FIG. 7, a positioning protrusion 45f is provided for the upper face of the rear piece 45d of the pickup chassis 45. An opaque plate 65 is fastened and fixed onto the rear piece 45d by the positioning protrusion 45f through a setscrew 52d. The opaque plate 65 has a sectional form of almost L-shape so as to cover the upper portion of the optical head 68 of the optical pickup 48 moved to an outermost position, particularly cover an objective 68a.

Moreover, a through-hole 66a is formed on the front margin of one side piece 45b of the pickup chassis 45 and a bearing portion 66b is provide for the rear end of the chassis 45. A bearing member provided for a feed motor 70 is fitted to the front through-hole 66a and the front end of a feed shaft 69 inserted into the through-hole 66a is rotatably supported by the bearing portion 66b. The feed shaft 69 serves as the rotating shaft of the feed motor 70. A spiral thread groove is formed on the outer periphery of the feed shaft 69 and the feed shaft 69 constitutes the rotor of the feed motor 70. The feed motor 70 is fixed to the front margin of the side piece 45b so as to protrude to the front of the pickup chassis 45 by fastening a fixed-side bracket 70a with two setscrews 52e.

A guide shaft 71 is set to the inside of the other side piece 45c of the pickup chassis 45 at the opposite side to the feed shaft 69 so as to be parallel with the feed shaft 69. Therefore, a pair of through-holes 72 is provided for the front and rear margins of the side piece 45c. By press-fitting the front and rear ends into these through-holes 72, both ends of the guide shaft 71 are supported by the pickup chassis 45.

Moreover, a cam piece 73 protruding toward the tilt cam 58 is provided for upper front margin of the other side piece 45c of the pickup chassis 45. A free end of a flat spring 74 is pressure-welded to the cam piece 73 and the cam piece 73 is pressure-welded to the cam face 58b of the tilt cam 58 located under the cam piece 73 by being pressed by the spring force of the flat spring 74. Moreover, the fixed end of the flat spring 74 is fastened and fixed to the upper face of the front piece 44a of the spindle chassis 44 by a setscrew 52f.

The optical pickup 48 movably supported by the feed shaft 69 and guide shaft 71 is guided by the shafts 69 and 71 so that it can approach to or go away from the turntable 47. The optical pickup 48 has a slide member 75 on which the optical head 68 is mounted. A bearing hole 75a is formed on one side of the slide member 75 and the feed shaft 69 is slidably inserted into the bearing hole 75a.

A rack portion 76a of a sliding rack 76 set to the lower face of the slide member 75 is engaged with the thread groove of the feed shaft 69. The rack portion 76a is integrally formed with a fixed piece 76b through an elastic piece and the sliding rack 76 is fixed to the slide member 75 by fastening the fixed piece 76b with a setscrew 52g. Moreover, a bearing portion 75b is provided for the other side of the slide member 75 and the guide shaft 71 is slidably held by the bearing portion 75b. A head feed mechanism for moving the optical pickup 48 is constituted of the feed shaft 69, feed motor 71, and sliding rack 76. Furthermore, a deceleration mechanism is constituted of the feed shaft 69 and the sliding rack 76.

The optical head 68 of the optical pickup 48 has a biaxial actuator capable of independently moving the objective 68a in the focus direction (vertical direction) and the tracking direction (transverse direction). The biaxial actuator exclusive uses an electromagnetic force as its driving force. This embodiment uses a flat-spring-type biaxial actuator classified as the difference between support systems of movable portions. However, it is a matter of course that it is possible to apply other system such as wire support system, hinge system, or shaft sliding system to a biaxial actuator. Symbol 77 shown in FIG. 7 denotes a biaxial cover for covering a biaxial actuator. An opening window 77a for exposing the objective 68a is provided for the biaxial cover 77.

Moreover, as shown in FIG. 2, a chuck holder 80 is set to the upper portion of the main chassis 12 so as to cross the upper side of the disk tray 13. As shown by an enlarged view in FIG. 10, the chuck holder 80 has a holder body 80*a*, a pair of setting portions 80*b* and 80*b*, and a cover portion 80*c*. The holder body 80*a* of the chuck holder 80 is discoid so as to be able to cover the disk storage portion 34 of the disk tray 13. A pair of setting portions 80*b* and 80*b* respectively protruding outward is provided for the both ends of the holder body 80*a* in one diametral direction. Moreover, the cover portion 80*c* is provided so as to extend outward from the outer margin of the holder body 80*a* in the direction orthogonal to the setting portions 80*b* and 80*b*.

A vertically-extending through-hole 80*d* is provided for the central portion of the holder body 80*a* of the chuck holder 80. Three leg pieces 82 of a chuck plate 81 are loosely inserted into the through-hole 80*d*. These three leg pieces 82 are arranged like a circular arc so that their outer peripheries form a part of a circumference and a discoid yoke plate 83 made of iron or the like to be attracted by a magnet 150 built in the turntable 47 is stored in the leg pieces 82.

A yoke pressing plate 84 is set to the front end of each leg piece 82 passing through the through-hole 80*d* of the chuck holder 80 and protruding upward. By holding the chuck holder 80 by the yoke pressing plate 84 and chuck plate 81 while keeping a predetermined gap, the chuck plate 81 can be moved in the direction orthogonal to the planar direction of the plate 81 in the range of the gap. Moreover, by setting a predetermined gap between the through-hole 80*d* on one hand and three leg pieces 82 on the other, the chuck plate 81 can be moved in its planar direction in the range of the gap.

It is preferable to use ABS resin for the main chassis 12, disk tray 13, and base holder 14. However, it is a matter of course that other synthetic resin can be used and moreover, it is possible to a metal such as an aluminum alloy. Moreover, it is preferable to use PPS (polyphenylene sulfide) containing 65% of glass fiber for the spindle chassis 44 and pickup chassis 45 constituting the base chassis 36. However, it is a matter of course that other synthetic resin can be used and it is also possible to use a metal such as an aluminum alloy.

According to the disk drive 11 having the above configuration, it is possible to reproduce data from the optical disk 33 as described below. First, the power supply of the disk drive 11 is turned on, for example, an eject button is pressed, the disk tray 13 is taken out to set an eject state, and thereby the disk storage portion 34 is exposed. Thus, it is possible to set the optical disk 33 to the large-diameter portion 34*a* or small-diameter portion 34*b*.

By setting a desired optical disk 33 to the disk storage portion 34 and then, for example, pressing a reproduce button to operate a loading mechanism, the disk tray 13 is carried to a disk setting portion. FIG. 17 shows the state.

When the loading motor 20 is driven by operating a reproduce button or the like while the disk tray 13 is carried, the torque of the motor 20 is transmitted to the driven pulley 23 from the driving pulley 21 through the rubber belt 22. The torque of the driven pulley 23 is transmitted to the driving gear 26 through the upper gear 25*a* from the middle gear 25*b* of the intermediate gear 25. The torque of the driving gear 26 is transmitted to the rack of the disk tray 13 and thereby, the disk tray 13 is moved to the rear of the main chassis 12 by being guided by the tray guide 31 and guide pins 32*a* and 32*b*. In this case, while the disk tray 13 moves up to the rearmost end, the chuck cam 27 does not move because the lower gear 25*c* of the intermediate gear 25 is not engaged with the rack 27*a* of the chuck cam 27.

Thereafter, when the disk tray 13 moves up to the rearmost end, the upper operation pin 27*c* of the chuck cam 27 enters a cam groove provided for the lower face of the disk tray 13 and the chuck cam 27 slightly moves by being guided by the cam groove. As a result, the rack 27*a* of the chuck cam 27 is engaged with the lower gear 25*c* and torque can be transmitted from the loading motor 20. Moreover, when the disk tray 13 reaches the rearmost end, the rack of the disk tray 13 is disengaged from the driving gear 26 and torque is not transmitted from the loading motor 20.

Then, when the torque of the loading motor 20 is transmitted to the rack 27*a* from the lower gear 25*c*, the chuck cam 27 moves against the spring force of the extension coil spring 29 in the direction going away from the loading motor 20. According to the movement of the chuck cam 27, the cam pin 28 of the base holder 14 engaged with the cam groove 27*b* moves from the lower horizontal portion of the cam groove 27*b* to the upper horizontal portion of the groove 27*b* through the slope. As a result, the base holder 14 is oscillated upward through the shaft portion 14*a* at the rear end and brought into an almost-horizontal state. FIG. 18 shows the above state.

In this case, when the front portion of the base holder 14 is raised, the turntable 47 supported by the oscillation side of the base unit 15 elastically supported by the base holder 14 through the insulator 43 enters the opening 35 of the disk tray 13. Thereby, the fitting portion 47*b* of the turntable 47 enters the center hole 33*a* of the optical disk 33 and the peripheral portion of the circumferential portion of the center hole 33*a* is mounted on the mounting portion 47*a* of the turntable 47. The optical disk 33 is slightly raised by the mounting portion 47*a* of the turntable 47 and the chuck plate 81 held by the chuck holder 80 is attracted by the magnet 150 built in the fitting portion 47*b* of the turntable 47.

As a result, the optical disk 33 is held by the turntable 47 and chuck plate 81. Thereby, the optical disk 33 is integrated with the turntable 47 in a rotational direction. Then, the optical disk 33 is rotated by the spindle motor 51 at a predetermined speed (e.g. constant linear speed).

The feed motor 70 is driven simultaneously with or before or after the rotation of the disk 33. As a result, the slide member 75 of the optical pickup 48 moves in the direction approaching to the turntable 47 in accordance with a rotational direction of the feed shaft 69. According to the movement of the optical pickup 48 in the direction approaching to the turntable 47, it is possible to detect a tilt of the optical disk 33 set to the turntable 47. Detection of the tilt of the optical disk 33 is performed as described below.

That is, when the optical pickup 48 moves inward from the radius-directional outside of the optical disk 33, the pickup 48 emits a laser beam from the objective 68*a* of the optical head 68 toward the information recording plane of the optical disk 33 and continuously detects the time until the laser beam returns. Thereby, it is possible to detect a tilt of the optical disk 33 by comparing detected times.

Then, an operation for correcting the tilt of the optical disk 33 thus detected is described below. It is assumed that the spindle chassis 44 and pickup chassis 45 constituting the base chassis 36 are tilted toward the turntable 47 as shown in FIG. 12. When a tilt of the optical disk 33 is detected under the above state, the tilt motor 56 is driven and its torque is transmitted from the rotating shaft 56*a* to the tilt gear 57. When the tilt gear 57 rotates, the torque is transmitted from the gear portion 58*a* engaged with the tilt gear 57 to the tilt cam 58 and the tilt cam 58 is rotated correspondingly to the rotation of the tilt motor 56.

The cam piece 73 of the pickup chassis 45 is always pressed against the cam face 58*b* of the tilt cam 58 due to the spring force of the flat spring 74. As a result, the cam piece 73 moves along the cam face 58b and thereby, the pickup chassis 45 is rotated about a pair of right and left shaft portions 63a and 63b provided for almost central portion and changes its attitude counterclockwise. When the highest position of the cam face 58b contacts with the cam piece 73 due to the rotation of the tilt cam 58, the pickup chassis 45 tilts backward as shown in FIG. 13.

When the tilt of the optical disk 33 is adjusted in accordance with adjustment by the above tilt mechanism, an information signal recorded in the information recording plane of the optical disk 33 is reproduced by the optical pickup 48. Reproduction of the information signal by the optical pickup 48 is performed as described below. That is, a laser beam is emitted from the objective 68a of the optical head 68 toward the information recording plane of the optical disk 33, the reflected light of the laser beam is received through the objective 68a, and thereby an information signal recorded in the information recording plane is reproduced.

Moreover, when the disk tray 13 is ejected, operations reverse to those for loading are performed. For example, when the ejecting operation is selected by pressing the eject button, the loading motor 20 is reversed and its torque is transmitted to the rack 27a through the driving pulley 21, rubber belt 22, driven pulley 23, and the lower gear 25c of the intermediate gear 25. Thereby, the chuck cam 27 approaches to the loading motor 20 and the cam pin 28 is lowered. As a result, the base holder 14 changes from the horizontal state shown in FIG. 18 to the forward-tilting state shown in FIG. 17.

Thereby, the base unit 15 supported by the base holder 14 is oscillated downward and the turntable 47 mounting the optical disk 33 is moved downward. Because the turntable 47 is lowered, the chuck plate 81 is removed. Then, the fitting portion 47b of the turntable 47 is removed from the center hole 33a of the optical disk 33 and the optical disk 33 is mounted on the storage portion 34 of the disk tray 13. Under the above state, the disk tray 13 can be taken out.

According to the disk drive 11 constituted as described above, most parts (excluding the rotation fulcrum of the pickup chassis 45) of the base chassis 36 are arranged in the opening 35 of the disk tray 13 and thereby, it is possible to downsize the pickup chassis 45. Thereby, it is possible to downsize the base unit 15 and moreover downsize the disk drive 11. Therefore, the disk drive 11 can be used not only as a stationary disk drive but also as a portable disk drive. Thus, the disk drive 11 can be used for general purposes.

FIG. 19 shows a schematic configuration of the disk drive 11 of the present invention which is provided with position adjusting means for adjusting a relative position between the spindle chassis 44 on which the spindle motor 51 is mounted and the pickup chassis 45 by which the optical pickup 48 is supported. The position adjusting means is provided with the compression coil spring 170 arranged so that the direction of the force for energizing the adjusting screw 168 becomes same as the adjusting direction of the screw 168 and constituted so that the pressure of the compression coil spring 170 is applied to the spindle chassis 44 and pickup chassis 45 only nearby a position contacting with the adjusting screw 168. Therefore, it is possible to prevent or control deformation of the spindle chassis 44 or pickup chassis 45 due to the pressure of the compression coil spring 170.

That is, when a moving trace SL obtained as a result of movement of the lens center Lo of the objective 68a of the optical head 68 of the optical pickup 48 for reading an information signal from the information recording plane of the optical disk 33 by applying a laser beam to the information recording plane does not pass through the rotation center Mo of the turntable 47 (also serving as the rotation center of the spindle motor 51), the control accuracy of a tracking servo (e.g. three-beam method) is deteriorated. Therefore, it is preferable that the moving trace SL of the lens center Lo of the objective 68a coincides with the rotation center Mo of the turntable 47. This position adjustment is performed by the above position adjusting means.

According to the position adjusting means, it is possible to perform the adjusting operation by rotating the adjusting screw 168 and thereby moving it forward or backward. That is, the pickup chassis 45 is pressed against one side of the spindle chassis 44 by the spring force of the compression coil spring 170 fitted to one shaft portion 63a of the pickup chassis 45 and the end face of the shaft portion 63a is brought into contact with the front end of the adjusting screw 168. Therefore, by moving the adjusting screw 168 forward or backward in the direction of an adjustment-directional line CL also serving as the rotation center of the pickup chassis 45, adjustment can be made very simply and accurately. Moreover, the front end 168a of the adjusting screw 168 is brought into contact with the adjusting slope 173a of the adjusting portion 173 provided for the end face of one shaft portion 63a and a downward pressure is applied to the shaft portion 63a by the adjusting slope 173a. Therefore, the shaft portion 63a is pressed against the V-shaped bearing face 60b of the first bearing portion 60 and thereby, the shaft portion 63a is prevented from rising and the backlash of the bearing portion 60 can be eliminated.

Moreover, the spring force of the compression coil spring 170 is applied only to the first bearing portion 60 of the spindle chassis 44 nearby a position contacting with the adjusting screw 168. As a result, the pressure of the compression coil spring 170 is not applied to the pickup chassis 45. Moreover, in the case of the spindle chassis 44, the pressure is applied only to the first bearing portion 60 having a comparatively-large strength but it is not applied to the side portions 44b and 44c of the spindle chassis 44. Therefore, it is possible to prevent or control deformation of the pickup chassis 45 or spindle chassis 44 due to the spring force of the compression coil spring 170.

As described above, the present invention is not restricted to the above embodiment. For the above embodiment, a case is described in which a read-only optical disk such as a CD or CD-ROM is used as a discoid recording medium. However, it is also possible to use a recordable optical disk or optical magnetic disk in which information can be newly written as a discoid recording medium. Moreover, for the above embodiment, a case is described in which an optical disk such as a CD is directly used. However, it is a matter of course that an optical disk can be used as an information recording medium set in a disk cartridge.

Furthermore, for the above embodiment, a disk-tray-type disk drive for reproducing (reading) the information recorded in an optical disk and its turn table are described. However, it is possible to apply the present invention not only to a recording-only disk drive for recording only information but also to a disk drive capable of recording and reproducing information and its turntable. Furthermore, for the above embodiment, a case is described in which a compression coil spring is used as an elastic body. It is possible to use not only a flat spring or extension coil spring but also a cylindrically-formed rubber-like elastic body. Thus, the present invention is not restricted to the above embodiment but it allows various modifications as long as the modifications are not deviated from the gist of it.

As describe above, according to the disk drive of the first aspect of the present invention, a mounting portion and a fitting portion of a turntable are formed into one body. Therefore, it is possible to provide a disk drive having a turntable that requires a less number of parts and less assembling man-hours, which can be inexpensively manufactured, and which is superior in productivity. Moreover, an advantage is obtained that it is possible to provide a disk drive having a turntable capable of accurately centering a discoid recording medium by a fitting portion while the discoid recording medium is mounted on a mounting portion of the turntable and securely holding the discoid recording medium by pressure-welding an elastic piece of the fitting portion to a center hole and superior in performance stability.

According to the disk drive of the second aspect of the present invention, a fitting portion of a turntable is constituted of a plurality of fixed pieces and a plurality of elastic pieces. Therefore, an advantage is obtained that it is possible to provide a disk drive having a turntable capable of accurately and securely centering a discoid recording medium though a simple structure is used.

According to the disk drive of the third aspect of the present invention, the other end of an elastic piece connected with a fixed piece at the tapered front end of the fitting portion of a turntable is extended outward in radial direction at the mounting portion side and formed into a free end. Therefore, an advantage is obtained that it is possible to provide a disk drive having a turntable capable of accurately and securely centering a discoid recording medium by pressure-welding the free end of the elastic piece to the center hole of the recording medium.

According to the turntable of the forth aspect of the present invention, a mounting portion and a fitting portion are formed into one body. Therefore, an advantages is obtained that it is possible to provide a turn table which requires a less number of parts used and less assembling man-hours, which can be inexpensively manufactured, which is superior in productivity, which makes it possible to accurately and securely center a discoid recording medium by the fitting portion, and which is superior in performance stability.

According to the turntable of the fifth aspect of the present invention, a fitting portion is constituted of a plurality of fixed pieces and a plurality of elastic pieces. Therefore, an advantage is obtained that it is possible to accurately and securely center a discoid recording medium though a simple structure is used.

According to the turntable of the sixth aspect of the present invention, the other end of an elastic piece connected with a fixed piece at the tapered front end of a fitting portion is extended to the outside of a mounting portion in the radial direction and formed into a free end. Therefore, an advantage is obtained that it is possible to accurately and securely center a discoid recording medium by pressure-welding the free end of the elastic piece to the center hole of the recording medium.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A disk drive comprising:

a turntable to which a disc recording medium used for recording and/or reproducing an information signal is mounted; and a spindle motor on which a rotatable portion of the turntable is set, wherein said turntable is provided with a mounting portion on which the disc recording medium is mounted and a fitting portion to be fitted to a center hole of the disc recording medium, said fitting portion having a plurality of radially arranged fixed pieces and a plurality of outwardly extending and radially arranged elastic pieces respectively set between adjacent fixed pieces whereby the fixed pieces and the elastic pieces are alternately arranged in the circumferential direction by maintaining a predetermined angular interval and wherein the fixed pieces and elastic pieces are continuously and integrally connected to the fitting portion and each said elastic piece decreases in thickness from an end attached to said fitting portion to a free end thereof; and the mounting portion and the fitting portion are formed into one body.

2. The disk drive according to claim 1, wherein the fitting portion of the turntable is set to a substantially central portion of the mounting portion.

3. The disk drive according to claim 1, wherein the fitting portion is conical, the fixed pieces and the elastic pieces respectively are connected to each other at a tapered front end of the fitting portion.

4. A turntable comprising:

a mounting portion on which a disc recording medium used to record and/or reproduce an information signal is mounted; and a fitting portion fitted to a center hole of the disc recording medium and having a plurality of radially arranged fixed pieces and a plurality of outwardly extending and radially arranged elastic pieces respectively set between adjacent fixed pieces whereby the fixed pieces and elastic pieces are alternately arranged in the circumferential direction by maintaining a predetermined angular interval and wherein the fixed pieces and elastic pieces are continuously and integrally connected to the fitting portion and each said elastic piece decreases in thickness from an end attached to said fitting position to a free end thereof, and wherein the mounting portion and the fitting portion are formed into one body.

5. The turntable according to claim 4, wherein the fitting portion is set to a substantially central portion of the mounting portion.

6. The turntable according to claim 4, wherein the fitting portion is conical, the fixed pieces and the elastic pieces are respectively connected to each other at a tapered front end of the fitting portion.

* * * * *